(12) United States Patent
Dando et al.

(10) Patent No.: US 11,607,852 B2
(45) Date of Patent: Mar. 21, 2023

(54) RESISTANCE WELDING METHODS AND APPARATUS

(71) Applicants: Spirit AeroSystems, Inc., Wichita, KS (US); Stichting TPRC, Enschede (NL)

(72) Inventors: Kerrick Robert Dando, Wichita, KS (US); Andrea Christine Meyer, Wichita, KS (US); Ulrich Sachs, Enschede (NL); Thibault Hernandez, Enschede (NL)

(73) Assignees: Spirit AeroSystems, Inc., Whichita, KS (US); Stichting TPRC, Enschede (NL)

( * ) Notice: Subject to any disclaimer, the term of this patent is extended or adjusted under 35 U.S.C. 154(b) by 0 days.

(21) Appl. No.: 17/580,240

(22) Filed: Jan. 20, 2022

(65) Prior Publication Data

US 2022/0227066 A1 Jul. 21, 2022

(30) Foreign Application Priority Data

Jan. 21, 2021 (NL) ...................................... 2027363

(51) Int. Cl.
| | |
|---|---|
| *B29C 65/34* | (2006.01) |
| *B29C 65/74* | (2006.01) |
| *B29C 65/00* | (2006.01) |
| *H01R 43/02* | (2006.01) |
| *B29K 307/04* | (2006.01) |
| *B29L 9/00* | (2006.01) |

(52) U.S. Cl.
CPC .......... *B29C 65/3468* (2013.01); *B29C 65/74* (2013.01); *B29C 66/43* (2013.01); *B29C 66/7212* (2013.01); *B29C 66/7392* (2013.01); *H01R 43/0214* (2013.01); *B29K 2307/04* (2013.01); *B29L 2009/00* (2013.01)

(58) Field of Classification Search
CPC ..... B29C 65/3468; B29C 65/74; B29C 66/43; B29C 66/7392; B29K 2307/04; H01R 43/0214
USPC ......................................................... 156/250
See application file for complete search history.

(56) References Cited

U.S. PATENT DOCUMENTS

| | | |
|---|---|---|
| 5,225,025 A | 7/1993 | Lambing et al. |
| 5,313,034 A | 5/1994 | Grimm et al. |
| | (Continued) | |

FOREIGN PATENT DOCUMENTS

| | | |
|---|---|---|
| EP | 0117012 | 8/1984 |
| EP | 3539755 | 9/2019 |
| WO | 2006105632 | 10/2006 |

OTHER PUBLICATIONS

Netherland search report for NL Application No. 2027363; Filed Jan. 21, 2021 and all references cited therein.

*Primary Examiner* — James D Sells
(74) *Attorney, Agent, or Firm* — Hovey Williams LLP

(57) ABSTRACT

Disclosed is a method of resistance welding between composite articles. A conductive element is provided between faying surfaces, having a plurality of lower resistivity electrode portions spaced apart along the length of the contact area between the composite articles. The electrode portions can be used to spot weld across the electrode portions, and along a longitudinal portion of the conductive element between the electrode portions by application of an electrical current. Also disclosed are apparatus for use in the resistance welding methods and composite articles and structures and elements incorporating the conductive element.

10 Claims, 10 Drawing Sheets

(56) References Cited

U.S. PATENT DOCUMENTS

| | | | |
|---|---|---|---|
| 5,389,184 A | 2/1995 | Jacaruso et al. | |
| 7,794,558 B2* | 9/2010 | Tsukada | B29C 66/0342 156/304.6 |
| 2009/0032184 A1 | 2/2009 | Yousefpour et al. | |

* cited by examiner

RESISTANCE WELDING METHODS AND APPARATUS

RELATED APPLICATION

This patent application claims priority benefit with regard to all common subject matter, of earlier-filed Netherlands Application No. 2027363, filed on Jan. 21, 2021, and entitled "RESISTANCE WELDING METHODS AND APPARATUS" hereby incorporated by reference in its entirety into the present application.

FIELD OF THE INVENTION

The invention relates to the field of resistance welding, in particular of thermoplastics materials as used for example in composites manufacture.

BACKGROUND TO THE INVENTION

Composite materials are widely used in a number of industries, such as aerospace, automotive, civil engineering and sports goods, due to their high strength-to-weight ratio. Composite materials such as carbon fibre composite and fibreglass composite are formed from a multiple plies or layers of fabric impregnated with and reinforcing a polymer matrix. For example, a carbon fibre fabric is formed by carbonizing a synthetic polymer fabric material and may be provided in the form of woven fabric, non-woven fabric or may consist of unidirectional fibres. Similar composites may be formed using alternative fibrous materials, such as glasses or synthetic polymers (e.g. aramid), or combinations of such materials. Composites may also be formed by mixing or dispersing relatively short strands or fibrils of a fibre material, such as carbon fibre or a glass fibre, within a polymer matrix to form a mouldable or injectable composite material.

For the construction of large or complex structures or components, for aerospace, marine, automotive applications and the like, it may be necessary to join composite articles to one another.

Whilst mechanical fixings and adhesives have been used, these can be time consuming and expensive to implement. These methods may also be associated with further disadvantages. For example, bonding between the polymeric matrix material and an adhesive may be weak, whereas mechanical fixings concentrate stress and may be prone to corrosion.

Fusion bonding of composite articles by ultrasonic, induction or resistance welding addresses a number of these drawbacks. By introducing heat energy into a thermoplastic polymer disposed between, of forming part of the composite articles, the thermoplastic polymer can be melted and subsequently cooled to join the two parts, typically whilst applying a pressure between the parts. These methods are of particular utility for thermoplastics composites, where the polymer matrix material of the composite parts themselves can be fused in this way.

Ultrasonic and induction welding are attractive in some respects, but in practice are complex to implement. Both methods require the welding apparatus (ultrasonic transducer or induction coil) to be applied close to but necessarily a distance apart from the faying surfaces themselves. Moreover, the welding "recipe" (i.e. the required operating conditions) depends strongly on the spatial constraints, such as distance between the welding apparatus and the faying surface (and, in the case of induction welding, a susceptor disposed between the faying surfaces) part geometry and thickness etc. Thus, producing consistent welds may be technically challenging.

Resistance welding uses a conductive heating element (which may also be termed a "susceptor") such as a metallic mesh placed between the faying surfaces or embedded in one or other of the surfaces. Electrodes or electrode portions of the conductive element extend out from between the faying surfaces, and electrical current is applied to the electrodes to generate resistive heating. Thermoplastic material between or forming part of the composite articles being joined is thereby melted to fuse the composite articles together.

The resistance welding method benefits from directly heating the faying surfaces, and so is not as sensitive to part thickness and geometry as induction welding. To date, however, resistance welding of composites has suffered from size limitations, because the applied voltages required to generate sufficient heat increase along with the length of a weld and quickly become impracticable or dangerous. In addition, the required voltages and duration of heating varies depending on both the width and length of a weld, which can prelude the effective use of resistance welding for complex faying surface geometries. In principle, carbon fibre layers within the composites themselves can function as the conductive element but the localised heating generated by the required voltages can lead to degradation or burning of the fibres themselves, still further limiting the weld size that is possible.

U.S. Pat. No. 5,38,184 (Jacaruso et al.) describes resistance welding method in which thermoset composites are provided with thermoset joining (i.e. faying) surfaces. A grid-like metallic foil heating element is disposed therebetween, with electrical leads extending out of the joint from the heating element. Although Jacaruso et al. provides for longer welds to be made by sequentially connecting pairs of electrodes, the higher conductivity electrodes lead to colder regions around the electrodes. This results in uneven welds and necessitates higher currents and/or more prolonged heating to ensure that the regions around the electrodes are properly welded.

A similar approach is proposed in U.S. Pat. No. 5,313,034 (Grimm et al.) but instead pairs of electrodes inserted into a joint or between faying surfaces, to electrically contact a length of conducting braid. The pairs of electrodes overlap with one another along the length of the joint to be welded which results effectively in "re-welding" the overlapping regions of the joint.

In US 2009/0032184, Yousefpour et al. propose a resistance welding method in which a continuous strip of conductive heating element extends between the faying surfaces and from each side of a joint. Electrodes of current-generating apparatus, in the form of rollers, are moved along the joint in contact with the exposed strip of the heating element, such that a weld region progresses continuously along the joint between the electrodes. The practical application of this method is limited by the need for access along the entire length of both sides of the joint.

There remains a need for improvements to the apparatus and methods for joining composite articles to address one or more of the foregoing problems.

SUMMARY OF THE INVENTION

According to a first aspect of the invention there is provided a method of resistance welding a first faying surface of a first composite article to a faying surface of a second composite article, wherein one or both of the faying surfaces comprises a meltable or softenable material; the method comprising:

contacting the first and second faying surfaces to define a contact area therebetween;

providing a conductive element between the faying surfaces along a length of the contact area; the conductive element comprising a plurality of lower resistivity electrode portions spaced apart along the length of the contact area; wherein each electrode portion extends across a respective width of the contact area and each end thereof comprising an electrode extending from the contact area;

applying an electrical current between the electrodes of a first said electrode portion to raise the temperature of the meltable or softenable material and weld together a portion of the faying surfaces between the electrodes of the first electrode portion;

applying an electrical current between the electrodes of a second said electrode portion to raise the temperature of the meltable or softenable material and weld together a portion of the faying surfaces between the electrodes of the second electrode portion; and applying an electrical current between electrodes of the first and second electrode portions to raise the temperature of the meltable or softenable material and weld together a portion of the faying surfaces between the first and second electrode portions.

Current applied to the electrodes across the electrode portions provides for localised or "spot" welding between the first and second composite articles, and current applied to electrodes of the plurality of (i.e. two or more) electrode portions spaced apart along the length of the contact area provides for selected regions along the length of the contact area to be resistively welded to one another. Each electrode portion of the conductive element has a lower resistivity than adjacent portions of the conductive element. The lower resistivity of the electrode portions ensures minimal current leakage to adjacent portions of the conductive element and thus minimal heating thereof, during the localised or spot welding across the width of the contact area. Similarly, the lower resistivity ensures that minimal re-melting or re-welding of these regions occurs when welding a portion of the length of the contact area.

The method thereby provides for a continuous weld to be formed between the composite articles along the length of the contact area in stages, without the need for high voltages to be applied between electrodes. Moreover, the electrode portions and electrodes can be selectively positioned where access is most convenient.

The meltable or softenable material may be a thermoplastic material or a vitrimer material. The meltable or softenable material may be a cured or fully consolidated, or partially cured or consolidated, or not previously cured or consolidated polymer or resin material. The skilled person will understand that a cured, curable, or meltable material may be softenable to some degree and susceptible to resistance welding.

The invention is not limited to any particular type of meltable or softenable material. Examples include an uncured or an at least partially cured epoxy resin material, vitrimer materials, or a thermoplastic material such as a polyethylene, a polypropylene, a polybutylene, a terephthalate, a polyamide, a polyphenylene sulphide, a polyether imide, a polyetherketoneketone (PEKK) or polyetheretherketone (PEEK), or mixtures or co-polymers thereof.

Once welded together, the faying surfaces can together be considered to form a join across the contact area.

The method may comprise applying an electrical current between electrodes of the first and second electrode portions before, or after applying an electrical current between the electrodes of the second said electrode portion.

For example, in some embodiments, it may be desirable to "spot weld" across a width of the contact area at the first and second electrode portions to fix the relative positions of the first and second composite articles, prior to welding along the length of the contact area therebetween.

The conductive element may comprise a third and a fourth electrode portion, and indeed any number of electrode portions in sequence along the length of the contact area.

The method may accordingly comprise applying an electrical current between the electrodes of a third said electrode portion to raise the temperature of the meltable or softenable material and weld together a portion of the faying surfaces between the electrodes of the third electrode portion;

applying an electrical current between the electrodes of a fourth said electrode portion to raise the temperature of the meltable or softenable material and weld together a portion of the faying surfaces between the electrodes of the fourth electrode portion; and applying an electrical current between electrodes of the third and fourth electrode portions to raise the temperature of the meltable or softenable material and weld together a portion of the faying surfaces between the third and fourth electrode portions.

The method may further comprise applying an electrical current between electrodes of the second and third electrode portions to raise the temperature of the meltable or softenable material and weld together a portion of the faying surfaces between the electrodes of the second and third electrode portions.

The steps may be conducted in any order, for example to resistively weld sequentially along a length of the contact area, or from the ends thereof towards an intermediate part of the contact area.

There may be any number of electrode portions, such that spot welding (between the electrodes of a given electrode portion) and welding portions of the length of the contact area (between electrodes of successive electrode portions) can be conducted in any suitable sequence, including between portions of the contact area separated by one or more electrode portions.

The steps of welding along a length of the longitudinal portion (by applying current between electrodes of first and second, second and third, third and fourth electrode portions, and so on) may be conducted by applying current between the electrodes of longitudinally adjacent electrode portions.

One or both ends of the longitudinal portion may comprise an electrode, and the method may comprise applying an electrical current between an end electrode of the longitudinal portion and an electrode of a said electrode portion, to raise the temperature of the meltable or softenable material and weld together a portion of the faying surfaces between the end electrode and the electrode of the said electrode portion.

Where the meltable or softenable material is a thermoplastic polymer, raising the temperature of the thermoplastic polymer includes raising the temperature above a melting point of the thermoplastic polymer to facilitate flowing or migration of the thermoplastic polymer.

In some embodiments, for example, the method may comprise providing a reinforcement material layer between the thermoplastic polymer and one or both of the first and second faying surfaces, whereby heating the thermoplastic polymer causes the thermoplastic polymer to impregnate the matrix material and improve the bond between the composite articles.

Raising the temperature of the thermoplastic polymer may comprise softening the thermoplastic polymer, to thereby join the faying surfaces to one another.

The method may comprise applying a force between the first and second composite articles, to urge the faying surfaces together. In some embodiments, the applied force my also prevent or reduce any localized deconsolidation of plies of reinforcement material in the region of the faying surfaces that might otherwise occur as a consequence of the generated heat.

The force may be applied during and/or after electrical current is applied during one or more, or all, of the steps of applying electrical current.

The method may comprise assembling the conductive element, by providing a conductive longitudinal portion having a length corresponding to a length of the required contact area, providing a plurality of conductive lateral portions each sized to extend across a width of the required contact area; and bringing the plurality of lateral portions into electrical contact with the longitudinal portion, at each of a plurality of required locations spaced apart along the length of the longitudinal portion, to thereby form electrode portions having lower resistivity than adjacent portions of the conductive element.

The longitudinal portion may be a single piece of material (of conductive mesh or fabric, as disclosed herein), or the method may comprise assembling the longitudinal portion from two or more pieces of material, by bringing them into electrical contact with one another.

The pieces of material from which the conductive element is formed may be cut to size, for example in situ when assembling the conductive element.

The pieces of material from which the conductive element is formed may be brought into electrical contact simply by placing them together, for example under a force applied between the first and second composite articles. Alternatively, or in addition, a piece of material from which the conductive element is formed may be welded or soldered together.

The method may comprise providing the conductive element, or at least portions thereof by applying a conductive paint or ink to the first and/or the second faying surface. A conductive paint or ink may be applied by any suitable method, for example spraying or using a roller. A template or pattern may be used. A paint or ink may be applied manually or in an automated manner. Multiple layers of coats of a conductive paint or ink may be used, for example selectively, to provide lower resistivity electrode portions. The method may comprise drying or curing the applied paint or ink. For example, UV curable inks bay be used and cured by irradiating with UV light.

In some applications, it may be desirable or required for the conductive element to be electrically insulated from its surrounding; for example to prevent current leakage into conducive reinforcing material within a said composite article.

The method may accordingly comprise selectively removing one or more portions of insulation from the conductive element, so as to form an electrode or to provide for electrical contact between pieces of the conducting element during assembly, such as between a lateral portion and the longitudinal portion.

The method may comprise placing the conductive element on the first faying surface. Placing the conducting element on the first faying surface may comprise assembling the conductive element in situ on the first faying surface.

The conductive element may in some embodiments form part of one or other of the first and second composite articles. Thus, the method may comprise making a (first or second) composite article comprising a faying surface and a said conductive element embedded in or on the faying surface.

The first and second composite articles may each comprise more than one faying surface. Accordingly, the method may comprise contacting more than one first faying surface with more than one corresponding second faying surface, to define more than one contact area; providing a conducting element between the faying surface of each of the more than one contact areas; and applying a current between the electrodes of a first electrode portion, a second electrode portion and between electrodes of a first and a second electrode portion of each of the more than one conductive elements.

The composite structure to be formed by resistance welding the faying surfaces of the first and second composite article may be a closed-geometry composite structure. A substantially enclosed volume may be defined between the first and second composite articles, when their faying surfaces are contacted.

As used herein, the terms "closed-geometry composite structure" or a structure or two articles together having or defining "a closed geometry" refers to a composite structure, or a geometry defined by two composite articles, in which a substantially enclosed volume is defined between two composite articles.

By "substantially enclosed volume", or a volume defined by a closed-geometry composite structure or between composite articles, we refer to a volume to which access to an edge region of a faying surface is prevented or substantially restricted by other portions of the composite article(s) or structure. A substantially enclosed volume may for example include a cavity having one or more openings. A substantially enclosed volume may be generally tubular, i.e. having a high aspect ratio (length to width or diameter), with an opening at one or both ends. A substantially enclosed volume may be accessible only by a slot or gap, other than via one or more apertures or openings, wherein the slot or gap prevents or restricts access to electrodes extending from a said edge region of a faying surface. A substantially enclosed volume may be bounded by greater than 50%, 60%, 70%, 80% or 90% of the external area of the volume by the composite structure or articles.

An example of a closed-geometry composite structure is a panel having one or more stringers or other such reinforcing structure. Stringers, omega forms and the like may be employed to increase structural rigidity of a composite article such as a panel (e.g. aircraft skin panel). Stringers, omega forms and the like typically include a box-construction that defines a tubular cavity or volume between the stringer or omega form (a first composite structure) and the panel (a second composite structure). The tubular cavity (substantially enclosed volume) is elongate and has an opening at one or both ends. Access to the inner edge regions of the contact areas within the cavity is greatly restricted.

Closed-geometries provide a particular challenge for resistance welding, because any part of a conductive element that is heated and that is not disposed between faying surfaces is prone to overheating and damage. Overheating can in turn result in damage to surrounding composite material. It is therefore not generally possible to use a single conductive element that extends within a substantially enclosed volume, bridging between separate contact areas.

To address this problem it may be desirable to provide separate conductive elements for each contact area. Access to electrodes extending from inner edge portions of contact areas, within a substantially enclosed volume may be restricted. The method may therefore comprise remotely establishing electrical contact with such electrodes. Remotely establishing electrical contact may be conducted using electrical connection apparatus as disclosed herein.

By "remotely" we mean that electrical contact is established by apparatus in one location (within the substantially enclosed volume) as a consequence of an action or control signal initiated in another location (outside of the substantially enclosed volume).

For example, the first composite article may comprise a primary first faying surface and a secondary first faying surface, and the second composite article may comprise a primary second faying surface and a secondary second faying surface. The method may comprise contacting the first and second primary faying surfaces, contacting the first and second secondary faying surfaces to define primary and secondary contact areas, and providing primary and secondary conductive elements therebetween.

Contacting the faying surfaces may define a substantially enclosed volume between the first and second composite articles.

Each contact area may comprise an inner edge region, within the substantially enclosed volume. Access to the primary and secondary inner edge regions may be greatly restricted.

The terms "primary" and "secondary" are not intended to infer any relative size or importance. A primary faying surface, contact area etc. may for example be larger, the same size as, or smaller than, a secondary faying surface, contact area, etc.

A primary and a secondary contact area may for example be defined between a stringer/omega form and a panel, by respective faying surfaces.

The method may further comprise;
providing a primary conductive element between the first and second primary faying surfaces, wherein the primary conductive element has a plurality of lower resistivity electrode portions spaced apart along the length of the primary contact area; and providing a secondary conductive element between the first and second secondary faying surfaces, wherein the secondary conductive element has a plurality of lower resistivity electrode portions spaced apart along the length of the secondary contact area;
wherein each electrode portion of the primary conductive element extends across a respective width of the primary contact area and comprises an outer electrode extending from the outer edge portion of the primary contact area, and an inner electrode extending from the inner edge portion of the primary contact area;
wherein each electrode portion of the secondary conductive element extends across a respective width of the secondary contact area and comprises an outer electrode extending from the outer edge portion of the secondary contact area, and an inner electrode extending from the inner edge portion of the secondary contact area;
the method further comprising:
applying an electrical current between the inner and outer electrodes of a first electrode portion of the primary conductive element, to raise the temperature of the meltable or softenable material and weld together a portion of the primary faying surfaces between the inner and outer electrodes of the first electrode portion of the primary conductive element;
applying an electrical current between the inner and outer electrodes of a first electrode portion of the secondary conductive element, to raise the temperature of the meltable or softenable material and weld together a portion of the secondary faying surfaces between the inner and outer electrodes of the first electrode portion of the secondary conductive element;
applying an electrical current between the inner and outer electrodes of a second said electrode portion of the primary conductive element, to raise the temperature of the meltable or softenable material and weld together a portion of the primary faying surfaces between the inner and outer electrodes of the second electrode portion of the primary conductive element;
applying an electrical current between the inner and outer electrodes of a second said electrode portion of the secondary conductive element, to raise the temperature of the meltable or softenable material and weld together a portion of the secondary faying surfaces between the inner and outer electrodes of the second electrode portion of the secondary conductive element;
applying an electrical current between electrodes of the first and second electrode portions of the primary conductive element to raise the temperature of the meltable or softenable material and weld together a portion of the primary faying surfaces of the first and second electrode portions of the primary conductive element; and
applying an electrical current between electrodes of the first and second electrode portions of the secondary conductive element to raise the temperature of the meltable or softenable material and weld together a portion of the secondary faying surfaces of the first and second electrode portions of the secondary conductive element.

As disclosed herein, access to inner edge portions of contact areas within a substantially enclosed volume may be restricted.

The method may therefore comprise moving an electrical connection apparatus into the substantially enclosed volume and remotely establishing an electrical connection using the electrical connection apparatus to a said inner electrode.

The method may comprise disconnecting the electrical connection apparatus from a said inner electrode moving the electrical connection apparatus and establishing an electrical connection to a second said inner electrode portion.

It will be understood that said electrical connection apparatus will be further configured to apply an electrical current, in conjunction with suitable electrical connection apparatus attached to outer electrodes, and a suitable electrical current source.

The steps of spot welding (applying current between inner and outer electrodes of a said electrode portion) and welding along a length of a said conductive element (applying current between electrodes of two electrode portions) may be conducted while a particular inner electrode is electrically connected by the electrical connection apparatus. Thus, the number of steps of remotely connecting, disconnecting and/or moving the electrical connection apparatus may be reduced or minimised.

In some embodiments, the steps of spot welding (applying current between inner and outer electrodes of a said electrode portion) and welding along a length of a said conductive element (applying current between electrodes of two electrode portions) may be separated by one or more steps of remotely disconnecting the electrical connection apparatus from one or more inner electrodes. For example, electrical connection may be remotely established with two or more inner electrodes, and established with two or more corresponding outer electrodes and spot welding conducted between corresponding inner and outer electrodes of a said conductive element. The inner electrodes may then be remotely disconnected and current applied between said outer electrodes (or other outer electrodes) to weld along a length of the conductive element.

The method may comprise remotely establishing electrical connection with two or more inner electrodes at the same time (simultaneously or sequentially) using the electrical connection apparatus.

The method may comprise remotely establishing electrical connection with an inner electrode of the primary conductive element and the inner electrode of the second conductive element at the same time (simultaneously or sequentially) using the electrical connection apparatus.

The method may comprise remotely establishing electrical connection with longitudinally adjacent inner electrodes of the primary conductive element and/or the secondary conductive element at the same time (simultaneously or sequentially) using the electrical connection apparatus.

As disclosed here, in some embodiments, in particular where two more inner electrodes of primary and secondary conductive elements are remotely connected using electrical connection apparatus, the method may comprise remotely disconnecting said electrodes and then welding along a length of each of the primary and secondary conductive elements, having established electrical connection between optionally adjacent primary outer electrodes and/or secondary outer electrodes.

The steps of welding along a length of the primary and/or the secondary conductive element (i.e. by applying current between electrodes of first and second primary electrode portions, and/or between first and second secondary electrode portions) may be conducted by establishing electrical connection between two or more inner electrodes at the same time.

For example, in some embodiments, electrical connection is established between two inner electrodes of a said conductive element using the electrical connection apparatus, and one or more spot welds across the conductive element is made (by applying current to respective outer electrodes); and while the inner electrodes are electrically connected, one or more portions along a length of said conductive element is welded, by applying current between the two inner electrodes.

The method may comprise remotely establishing an electrical connection between two or more longitudinally adjacent inner electrodes at the same time, using the electrical connection apparatus.

Electrode portions of the primary conductive element may be longitudinally aligned with one another. For example, in the case of high aspect ratio primary and secondary contact areas, extending parallel or generally parallel to one another, the primary and secondary electrode portions may be laterally aligned. It may thereby by convenient to remotely establish electrical connection between inner electrodes of laterally aligned primary and secondary electrode portions at the same time.

The steps may be conducted in any order. Conveniently, the steps of applying an electrical current between inner and outer electrodes of the respective electrode portions are conducted before applying current between electrodes of first and second electrode portions. That is to say, the method may comprise spot welding, across electrode portions, followed by welding along lengths of the contact areas between electrode portions.

It will be understood that the method when performed on composite article comprising primary and secondary (or further) faying surface may comprise any of the steps disclosed herein in relation of any composite articles and corresponding faying surfaces etc.

The electrical connection apparatus, or a part thereof, may be propelled into, or self-propelled into the substantially enclosed volume. For example, the electrical connection apparatus may comprise a drive arrangement configured to propel the electrical connection apparatus into, along or through the substantially enclosed volume.

The first or second composite article comprising the conductive element or elements may be made by any suitable method known to one skilled in the art.

Making a composite article may comprise laying multiple plies of reinforcement fabric (e.g. glass fibre, carbon fibre, aramid fibre, fabrics comprising more than one such fibre, woven or non-woven) on a mould surface to form a reinforcement lay-up. The method may further comprise infusing the lay-up with a matrix material.

The conductive element or elements may be infused with the matrix material, during the making of the composite article—i.e. the conductive element may be laid up on the mould surface (before laying up plies or reinforcement material, between plies or reinforcement material, or after the plies of reinforcement material). Alternatively, the conductive element or elements may be provided after infusion.

A reinforcement material may be used that is pre-impregnated with a matrix material. The method may comprise heating or otherwise consolidating or curing the plies of reinforcement material.

The first and second composite articles may each comprise a matrix material, one or both of which may be the meltable or softenable material, such as a thermoplastic polymer or vitrimer material.

The matrix material may be a curable resin or polymer material, and the meltable or softenable material may be a different material from the matrix material. The method of making the composite article may comprise at least partially curing the composite article.

The conductive element or elements may be embedded in or on the curable (or cured) matrix material, or provided after the at least partial curing, in some embodiments together with a layer or layers of a meltable or softenable material, such as a thermoplastic polymer.

The conductive element or elements may comprise the same material as the reinforcement material of the first and/or second composite article. The conductive element(s) may comprise different or additional, more conductive materials.

Autoclave and out of autoclave methods, as known in the art, may be used.

The composite article may be made by injection moulding, of a matrix material impregnated with chopped fibres of fibrils into a mould. The conductive element may be provided in the mould, or may be provided after injection moulding.

Once the first and second composite articles have been joined by resistance welding as disclosed herein, to form a composite structure, the electrodes extending from the (now joined or welded) faying surfaces may be trimmed away.

Alternatively, the electrodes may be left in place. The electrodes may later be used, for example to facilitate a repair of the composite structure. The electrodes may later be used to conduct non-destructive testing, as disclosed herein.

Thus, the invention extends to a method comprising repairing a composite structure as disclosed herein, by applying a current between the electrodes of a said electrode portion, or between electrodes of adjacent electrode portions.

The conductive element(s) disclosed herein may also be used for non-destructive testing of the composite structure formed from the first and second composite articles. Non-destructive testing can be used to assess the quality of a resistive weld, or may be used at a later time for inspection or maintenance purposes.

Non-destructive testing may include heating a portion of the conductive element to below a melt or softening temperature (i.e. by applying an electrical current lower than that used for welding, or for a shorter period) and acquiring a thermographic image of the composite structure in the heated region of the conductive element. Thermographic imaging may be conducted using infra-red sensitive imaging apparatus, as known to one skilled in the art.

Using thermographic imaging it may be possible for example to identify voids or damage in the weld or the composite material surrounding the weld. Thermographic images may also be used to identify damage to the conductive element, such as hotspots—which may for example correspond to voids or lower density regions, or cold regions—which may correspond to regions in which current does not flow due to damage.

A portion of the conductive element may be heated for the purposes of non-destructive testing by applying current between electrodes of longitudinally adjacent electrode portions. In closed geometry composite structures, as disclosed herein, a portion of a primary or secondary conductive element may be heated for the purposes of non-destructive testing by applying current between inner electrodes of longitudinally adjacent electrode portions, or between one inner and one outer electrode.

In some embodiments, thermal imaging may be conducted within the substantially enclosed volume. An electrical connection apparatus may for example be provided with a thermal imaging apparatus.

The conductive element(s) may be used for non-destructive testing of other types, such as electrical testing of the conductive element, for example resistivity measurements. Variation in electrical properties over time may for example be an indication of corrosion.

Method of non-destructive testing conducted within a closed-geometry composite structure are of particular benefit where regions of a contact surface cannot otherwise be inspected.

The method may comprise attaching an electrical current source between a pair of the said electrodes. An alternating or direct current source may be used. The frequency or voltage may be selected as required in order to generate sufficient heat between a particular pair of electrodes, to melt or soften the meltable or softenable material between the electrodes. The welding recipe (including one or more of the duration, voltage, current and/or frequency of the applied current) may be varied during the method. For example, the "recipe" for resistively welding a part of the longitudinal portion (e.g. between electrodes of a first and a second electrode portion) may be different from the recipe for resistance welding between electrodes of a said electrode portion. The recipe for resistively welding one said electrode portion may differ from the recipe for resistively welding another said electrode portion. The recipe for welding between electrodes of the first and second electrode portions may differ from the recipe for welding between electrodes of another pair of electrode portions.

It will be understood that the method may comprise multiple steps of attaching and detaching respective pairs of electrodes to/from the current source.

Each electrode of a pair of electrodes to be connected may be accessed from the same side of the first and second composite articles; for example where the second composite article is placed against a face of the first composite article or vice versa, each electrode of a pair electrode may be accessed from the adjacent the same face of the first composite article. Each electrode of a pair of electrodes to be connected may be accessed from different sides of the first and/or second composite articles; for example where the composite articles overlap one another to define the contact area.

In a second aspect of the invention there is provided a method of providing a conductive element for use in resistively welding a faying surface of a composite article comprising a meltable or softenable material to a faying surface of another composite article, the method comprising:

providing a conductive longitudinal portion having a length corresponding to a length of a required contact area between said faying surfaces;

providing a plurality of conductive lateral portions having an electrode at each end thereof; each sized to extend across a width of the required contact area; and bringing the plurality of lateral portions into electrical contact with the longitudinal portion, at required locations spaced apart along the length of the longitudinal portion, to thereby form electrode portions having lower resistivity than adjacent portions of the conductive element.

The longitudinal and/or lateral portions may be cut to size from a sheet or fabric material, such as a mesh or foil as disclosed herein, or a printed pattern disposed on a removable backer material. The longitudinal portion may be formed from the same material (e.g. cut from the same sheet or fabric material) as the lateral portions.

The longitudinal portion may be provided having a length and width substantially that of a faying surface of a composite article to be joined.

Each lateral portion may be sized such that the electrode portions extend laterally beyond the faying surface to be joined. That is to say, the lateral portions are sized such that in use the electrode portions extend (laterally) from the required contact area between the faying surfaces.

Each lateral portion may be sized to have a length substantially that of the width of a faying surface to be joined, or a length greater than the width of the faying surface to be joined, at the position of said lateral portion. Each lateral portion may be sized to have a length substantially that of the width of the longitudinal portion a faying surface to be joined, or a length greater than the width of the faying surface to be joined, at the position of said lateral portion. It will be understood that the length of the lateral portions may vary, if the width of the faying surface varies along its length.

The longitudinal portion and/or lateral portions may be provided with an electrically insulating layer or coating. For example, the conductive element may comprise a plastics coated metallic mesh.

The method may comprise selectively removing one or more portions of insulation from the conductive element, so as to form an electrode or to provide for electrical contact between pieces of the conducting element during assembly.

For example, the method may comprise selectively removing insulation from the lateral portions, to provide the electrodes.

The electrodes may be alternatively provided by placing an electrode (for example an electrical cable, conduit or wire, or a piece of conductive sheet or foil) in electrical connection an end of a said lateral portion.

The longitudinal portion may, in some embodiments, be formed from multiple pieces of material. The method may accordingly comprise placing said pieces together, to form the longitudinal portion.

Pieces of material from which the conductive element is assembled may be placed in electrical contact by welding or soldering, may be mechanically joined by wires or the like, or in use a mechanical force (such as between faying surfaces) may maintain electrical contact.

The method may comprise cutting the longitudinal portion and/or the lateral portions to size.

The conductive element may be provided or assembled in situ, for example by cutting the longitudinal and/or lateral portions to size, on a faying surface of a composite article (prior to resistively welding to another composite article), or during manufacture thereof.

The conductive element or at least portions thereof may be provided by applying a conductive paint or ink to the first and/or the second faying surface, as disclosed herein in relation to the first aspect.

A third aspect of the invention relates to a conductive element for use in resistively welding a faying surface of a composite article comprising a thermoplastic polymer to a faying surface of another composite article, the conductive element comprising a longitudinal portion having a length (and typically also a width) corresponding substantially to the length (and typically width) of a required contact area between said faying surfaces; and a plurality of lower resistivity electrode portions spaced apart along a length of the conductive element, each electrode portion extending across a respective width of the conductive element and comprising an electrode at the ends thereof.

It will be understood that the longitudinal and lateral portions are in electrical contact with one another. The longitudinal portion and the electrodes may each extend laterally beyond a width of the required contact area of the faying surfaces to be joined, at the position of the said electrode portion. Accordingly, in use the electrodes of a given electrode portion can be accessed so as to apply current across a width of the contact area and create a spot weld. The electrodes may each extend laterally beyond a width of the longitudinal portion, at the position of the said electrode portion The conductive element may be obtained, or obtainable, by the method of the second aspect.

The conductive element may comprise a conductive (e.g. metallic) mesh, such as a wire mesh or a conductive foil formed as a lattice (i.e. with apertures therethrough). The conductive element may comprise a conductive fabric, such as a woven metallic mesh, a conductive fibre fabric such as carbon fibre fabric, woven or nonwoven. The conductive element may comprise any suitable electrically conductive material or materials, such as steel, copper or other metals, carbon fibre, graphene or combinations of any such material. For example, in some embodiments the conductive element comprises a carbon fibre fabric interwoven with metallic filaments. The conductive element may comprise a printed pattern of a conductive ink. The conductive element may comprise a conductive paint. Conductive inks or paints, comprising for example a dispersion or suspension of conductive particles such as graphite, metal powder, conductive ceramic, metallic colloids or the like are known to one skilled in the art.

The longitudinal portion of the conductive element may be sized to extend along substantially all, or all, of the length of the faying surfaces to be joined.

The longitudinal portion of the conductive element may be sized to extend across substantially all, or all, of the width of the faying surfaces to be joined.

The lower resistivity of the electrode portions can be achieved in a variety of ways. For example the electrode portions may be formed of a lower resistivity material, such as a thicker mesh or fabric than the adjacent portions of the conductive element. The electrode portions may comprise one or more additional layers than the adjacent portions of the conductive element. For example, longitudinal portion may comprise a conductive sheet, foil or fabric (or other generally planar conductive material) and the electrode portions of the conductive element may each further comprise a lateral portion comprising one or more layers of a conductive sheet, foil or fabric (or other generally planar conductive material) placed across a respective width of the longitudinal portion, in electrical contact therewith, as disclosed herein. Conveniently, the same material may be used for the lateral and longitudinal portions, but in some embodiments one or more layers of a different material may be used.

In some embodiments the electrode portions comprise separate electrodes coupled to or placed in electrical contact with, the electrode portions, or end portions as the case may be.

The conductive element, and thus the faying surfaces to joined and the contact area defined therebetween, may be any suitable size or configuration. However, in some embodiments the invention may be advantageously applied to high aspect ratio contact areas and/or contact areas with a width that varies along its length.

For example a high aspect ratio contact area (i.e. very long and thin—for example a length to width ratio of at least 1:5, 1:10, or 1:100 or more) that would ordinarily require extremely high voltages to resistively weld, can be resistively welded in portions, in the stepwise manner disclosed herein. Similarly, contact areas with variable width, such as areas that taper (for example as between generally triangular faying surfaces), would conventionally require resistive welding conditions to be optimised for the widest portion or portions of the contact area. Whereas, the invention provides for such contact areas to be resistively welded in portions, and for the welding recipe or conditions to be optimised for each portion.

The invention extends in a fourth aspect to a method of making a composite article; the method comprising providing a conductive element by the method of the second aspect or providing a conductive element of the third aspect; providing a composite article having a faying surface; and attaching the conductive element to, or embedding the conductive element in, the faying surface.

The faying surface may comprises a meltable or softenable material, such as a thermoplastic polymer.

The composite article may be provided by any suitable method, such as by laying plies of a reinforcement material on a mould, and, in some embodiments, impregnating the plies with a matrix material (such as, in some embodiments a thermoplastic matrix material).

The method may comprise assembling or providing the conductive element on the mould, before or after laying plies of a reinforcing material.

Typically, such embodiments result in a composite article having a faying surface with the conductive element embedded therein.

The method may comprise removing insulating or matrix material from the conductive element, to form electrodes. Electrodes may alternatively or in addition be subsequently placed into electrical contact with the conductive element (i.e. the electrode portions and in some embodiments one or both ends of the longitudinal portion).

In some embodiments, the method may comprise consolidating plies of reinforcement material, by compressing and/or heating in a vacuum bag or autoclave, heating (to melt or cure the matrix material) and other such steps of composite manufacture as known to one skilled in the art.

The invention extends in a fifth aspect to a composite article comprising a reinforcement material embedded in a matrix material and having a faying surface and a conductive element on or embedded in the faying surface, the conductive element comprising a longitudinal portion having a length (and typically also a width) corresponding substantially to the length (and typically width) of the faying surface; and a plurality of electrode portions spaced apart along a length of the conductive element, each electrode portion extending across a respective width of the faying surface and comprising an electrode at the ends thereof.

The electrodes each extend laterally beyond a width of the faying surface, at the position of the said electrode portion.

The faying surface may comprise a meltable or softenable material, such as a thermoplastic polymer. The matrix material may be a thermoplastic polymer.

The composite article may comprise two or more faying surfaces. The composite article, may be configured such that, in conjunction with another composite article having corresponding faying surfaces (such as first and second primary, and first and second secondary, faying surfaces as disclosed herein) the composite article defines a closed-geometry composite structure.

In a sixth aspect of the invention there is provided a composite structure comprising a first composite article and a second composite article, and a join having an area defined by respective faying surfaces of the composite articles, wherein the join comprises a metlable or softenable material by which the composite articles are held together and wherein the composite structure comprises a conductive element as disclosed herein, in the join between the faying surfaces or embedded within one of the said faying surfaces along the join.

The join may comprise a thermoplastic polymer. The meltable or softenable material may be present as a layer between the composite articles and/or the matrix material of one or both composite articles may comprise a meltable or softenable material (which may be the same or a different material to the material of the join).

Each composite article may comprise a primary faying surface and a secondary faying surface, and the composite structure may comprise a primary join and a secondary join, with a corresponding primary and secondary conductive element therein.

The composite structure may be a closed geometry structure. An enclosed volume thereof may be defined between the primary and secondary joins. The first composite article may for example be a stringer or an omega form, the composite structure having generally parallel and spaced apart primary and secondary joins of high aspect ratio.

In a seventh aspect of the invention there is provided an electrical connection apparatus. In particular, an apparatus for use in resistance welding to form a closed-geometry composite structure. The apparatus is of particular utility in use within a high-aspect ratio substantially enclosed volume.

Such closed-geometry composite structures are disclosed herein, comprising first and second composite articles, the first composite article having a first primary and a first secondary faying surface and the second composite article having a second primary and a second secondary faying surface, defining a primary and a secondary contact area therebetween, wherein a corresponding primary and secondary conductive element is disposed in the respective primary and secondary contact areas. Each contact area has an inner edge region within the substantially enclosed volume and an outer edge region. Each conductive element has a plurality of (primary and secondary, as the case may be) electrode portions spaced apart along the length of the contact area and each extending across a width thereof. Each electrode portion has an inner electrode, extending from the inner edge region within the substantially enclosed volume and an outer electrode, extending from the outer edge region.

The electrical connection apparatus may be adapted to remotely establish an electrical connection with an inner electrode of the primary or the secondary conductive element.

The electrical connection apparatus comprises a probe arrangement comprising:

a foot portion having an engagement surface for engaging a surface of the substantially enclosed volume; and comprising an electrical contact element;

a shoulder portion having an engaging surface for engaging an opposite surface of the substantially enclosed volume;

a reconfigurable body portion operatively coupled between the foot portion and the shoulder portion; the reconfigurable body portion being remotely configurable between a contracted configuration, and an expanded configuration wherein;

in the contracted position the engagement surfaces are spaced apart by less than a distance between opposed surfaces of the substantially enclosed volume; and in the expanded configuration the engagement surfaces are further spaced apart sufficient to engage opposed surfaces of the substantially enclosed volume and to urge the electrical contact element into electrical contact with an inner electrode within the substantially enclosed volume.

In use, while the body portion is in the contracted configuration (and the distance between engaging surfaces is less than the distance between opposed inner surfaces of the substantially enclosed volume), the probe portion may be introduced into the substantially enclosed volume defined between composite articles, until the electrical contact element is adjacent an inner electrode. The body portion can then be reconfigured to cause both of the engaging surfaces against the opposed inner walls of the substantially enclosed volume and to urge the electrical contact element into electrical contact with the inner electrode.

Typically, the foot portion is oriented downwards and the engagement surface of the foot portion rests against an inner wall of the enclosed volume throughout, and reconfiguring the body portion causes the engagement surface of the shoulder portion to engage with the opposed surface or surfaces of the substantially enclosed volume.

The reconfigurable body portion can be remotely reconfigurable in any suitable way, for example pneumatically, hydraulically, mechanically or electromechanically.

By "remotely reconfigurable" we mean that the reconfiguration of the reconfigurable body portion may be effected by a control action initiated from outside of the substantially enclosed volume. A control action may for example be an electrical signal, to actuate a pump or open a valve. A control action may for example be an electrical signal, to actuate an electromechanical device. A control action may be actuation (opening or closing) of a valve, or a sequence of valves (e.g. to inflate and/or deflate an inflatable chamber, as disclosed herein).

A control action may comprise actuation of a mechanism, for example a mechanical linkage operable to cause reconfiguration of the body portion.

The reconfigurable body portion may be disposed between the shoulder portion and the foot portion.

In some embodiments, the reconfigurable body portion may comprise an inflatable chamber, such as an inflatable bladder. An inflatable chamber may be pneumatically or hydraulically inflatable. The reconfigurable body portion may comprise one or more inflatable chambers.

An outer surface of the/each inflatable chamber may comprise the shoulder portion and engagement surface. The inflatable chamber may be disposed between the shoulder portion and the foot portion.

An inflatable chamber be connected to an inflation conduit, connected or connectable at the end thereof to a pump, or a supply of compressed air or a liquid (e.g. water).

The electrical connection apparatus may comprise a pump, operable to pump fluid into the inflatable chamber. The probe portion may comprise a pump, to supply fluid (e.g. air) to said inflatable body, or part thereof.

The foot portion may comprise more than one electrical contact element.

The foot portion may comprise a primary electrical contact element oriented towards a first side of the probe arrangement, and a secondary electrical contact element oriented towards a second side of the probe arrangement.

In use, primary inner electrodes and secondary inner electrodes can be positioned opposite to one another. The electrical contact apparatus may be run into the substantially enclosed volume and the body portion reconfigured to urge both the primary and secondary electrical contact elements into electrical contact with the respective inner electrodes at the same time.

An electrical contact element may comprise an electrically conductive contact surface, typically flat. An electrical contact element may comprise an electrical conductive contact surface may be dimensioned larger than an inner electrode, to provide for a degree of positional tolerance.

In the contracted configuration, (and when the foot portion is oriented downwards) the electrically conductive contact surface may be above and/or extend laterally at an angle upwardly from the engagement surface of the foot portion. In the expanded configuration, the electrically conductive contact surface may be lowered and/or pivot. In use an inner electrode portion may be trapped between the electrically conductive contact surface and the inner wall.

An electrical contact element may comprise two opposed electrically conductive surfaces, operable to trap or pinch an inner electrode therebetween. The two opposed electrically conductive surfaces may be operable to trap or pinch an inner electrode therebetween when the reconfigurable body portion moved from the contracted to the expanded configuration. The two opposed electrically conductive surfaces may be operable to trap or pinch an inner electrode therebetween when the reconfigurable body portion moved from the contracted to the expanded configuration and the engagement surfaces engage with the inner walls of the substantially enclosed volume, in use. That is to say, the reconfigurable body portion may act between the engaged engagement surfaces and urge the upper and lower electrical contact surfaces together.

The foot portion may for example comprise a lower electrically conductive contact surface, fixed in relation to the engagement surface, and an upper electrically conductive contact surface, movable in relation to the engagement surface, between a raised configuration (when the body portion is in the contracted configuration) and a lowered configuration (when the body portion is in the extended configuration).

In use, the composite articles and primary and secondary conductive elements may be arranged such that the inner electrodes extend out of the inner portions of the respective faying surfaces at an angle to any adjacent composite surfaces. The probe portion may be positioned to place one or more said inner electrodes between the opposed upper and lower electrically conductive contact surfaces. When the body portion is moved to the extended configuration, each said inner electrode becomes trapped between the contact surfaces.

The lower and upper electrically conductive contact surfaces may be biased apart, for example spring biased.

By "upper" and "lower", "above" and "below" and other such terms, we refer to the relative orientation of various features, in relation to the electrical connection apparatus when the foot portion is oriented downwards. These terms are not intended to be limiting to that particular orientation.

The or each probe portion may comprise more than one foot portion engagement surface and/or more than one shoulder portion engagement surface. It will be understood that the probe portion may be configured to effectively engage the walls of a particular size and configuration of substantially enclosed volume. For example, stringers or other structural elements may define an elongate enclosed volume having one of a range of cross sectional shapes, and the foot portions and shoulder portions may be configured to have corresponding external shapes, at least in part. Furthermore, in use the orientation of the electrical contact apparatus, or the probe portion(s) thereof may be dictated by the orientation of the composite articles. It may for example be required to run the apparatus with the probe portion(s) at an angle, or with the foot portion above the shoulder portion.

The electrical connection apparatus may comprise two probe portions, or more than two probe portions.

The two probe portions may be spaced apart by a longitudinal distance between longitudinally adjacent inner electrodes. This may enable the electrical connection apparatus to be connected to longitudinally adjacent inner electrodes at the same time. In use, both spot welds between the longitudinally adjacent inner electrodes and the corresponding outer electrodes, and a length of the faying surfaces between the longitudinally adjacent inner electrodes may be conducted without the need to reposition the electrical connection apparatus.

A first probe portion may be attachable to a first inner electrode (or, in some embodiments primary and secondary first inner electrodes, at the same time), and a second probe portion may be attachable to a second inner electrode (or, in some embodiments primary and secondary second inner electrodes, at the same time), at the same time or simultaneously.

In some embodiments, the first and second probe portions may be connectable to two pairs of primary and secondary inner electrodes at the same time, or simultaneously. The two pairs of primary and secondary inner electrodes may be longitudinally adjacent to one another.

The distance between two probe portions may be adjustable.

The two probe portions may be flexibly connected. A flexible connection may be via a flexible conduit or umbilical as disclosed herein. The flexible connection may be longitudinally incompressible (under the forces encountered in use).

Two or more probe portions may share certain apparatus, such as a pump.

The foot portion and/or shoulder portion of the or each probe portion may be adapted to slide within the substantially enclosed volume, in use. The foot portion and/or shoulder portion of the or each probe portion may comprise one or more wheels or castors.

The electrical connection apparatus may comprise a trolley, the trolley comprising the or each probe portion. The trolley may comprise one or more wheels of castors.

The position of the/each probe portion may be adjusted in relation to the substantially enclosed volume by any electrical, mechanical, and/or hydro-mechanical means known in the art. In some embodiments, in use the position is adjusted manually.

The electrical connection apparatus may comprise a drive arrangement, operable to adjust the position of the or each probe portion. The drive arrangement may be operable to propel the or each probe portion into or through the substantially enclosed volume.

The drive portion may be adapted to move within the substantially enclosed volume. For example, the trolley or one or more of the foot portions may comprise one or more driven wheels.

The drive portion may be located outside of the substantially enclosed volume.

The drive portion may comprise one or more driven wheels, positioned to engage against or around the elongate member. The one or more driven wheels may be spring biased against the elongate member. The one or more driven wheels may be provided with a resilient coating or formed of a resilient material, to frictionally engage with the elongate member. The one or more driven wheels may be driven by an electric motor.

The drive portion may be operable to index the position of the/each probe portion, so that the position of the probe portion(s) in relation to the inner electrodes can be measured. The elongate member may be indexed, for example by measurement marks along its length.

In some embodiments, the apparatus comprises an elongate member (such as a conduit or umbilical as disclosed herein) and the/each probe portion is connected to a distal end thereof.

The elongate member may be flexible.

The electrical connection apparatus may comprise a conduit or umbilical, which in use extends between the probe portion(s) and ancillary apparatus outside of the substantially enclosed volume, such as an electrical current source, a pump, a compressed air or fluid source and the like. Two or more probe portions may be positioned along a length of the umbilical.

The umbilical may extend through (and connect ancillary apparatus to) a first probe portion, to connect the ancillary apparatus to a second probe portion.

The umbilical may be tubular. The umbilical may be flexible. The umbilical may be longitudinally incompressible (under the forces encountered in normal use).

The electrical connection apparatus may comprise a non-destructive testing apparatus.

The non-destructive testing apparatus may comprise a thermal imaging camera. The non-destructive testing apparatus may comprise a resistance or current measurement apparatus.

The non-destructive testing apparatus, in particular a thermal imaging camera may be fixed in relation to the or each probe portion. The non-destructive testing apparatus may be attached to or proximal to a probe portion. The non-destructive testing apparatus may be configured for use within the substantially enclosed volume.

The trolley may comprise the non-destructive testing apparatus. The non-destructive testing apparatus may be configured to perform non-destructive testing within the substantially enclosed volume.

The methods and apparatus disclosed herein may be of particular utility in aerospace, for example to join large or elongate composite articles together. Aerospace structures may comprise elongate formations, such as stringers or box sections used to reinforce fuselage or wing structures. Joining of large or elongate composite articles such as stringers is facilitated by the stepwise approach disclosed herein. Aerospace structures may also have a complex shape and configuration, as required for aerodynamic performance, and the methods and apparatus of the invention provide for resistive welding conditions to be adjusted along or across a contact area having a complex geometry.

It is to be understood that the various optional features disclosed in relation to each aspect of the invention apply also to each other aspect of the invention. In particular, the aspects of the apparatus disclosed herein may comprise any structural features disclosed in relation the methods of the invention and, conversely, the aspects of the methods disclosed herein may make use of, or be used to form, any features of the apparatus of the invention.

Reference herein to "thermoplastic" polymer or material relates to a polymer or material that softens and melts above a certain temperature. A thermoplastic material or polymer may flow or otherwise diffuse into or conform to the surface of an adjacent article, when heated. The thermoplastic polymer or material hardens when cooled and may be re-heated and cooled multiple times.

Reference herein "composite" and "composite article" includes a material, article or structure comprising a reinforcement material and a matrix material. The reinforcement material may be a fibrous material such as carbon fibre, aramid fibre, glass fibre, plant fibre or the like (or any mixture thereof). The fibrous material may be dispersed within the matrix material, and may take the form for example of chopped fibrous material. The fibrous material may be layered, such as plies of non-woven or woven fabric. A composite article, material or structure may comprise more than one type of reinforcement material. A matrix material may be, of be formed from a resin or polymer material. A matrix material may be curable or thermoplastic. A matrix material may, when heated, be meltable or softenable, sufficient to be resistively welded.

Reference herein to "conductive" relates to electrical conductivity. Similarly, "resistance" and "resistively" welding, heating etc. relates to Ohmic or Joule heating resulting from application of an electrical current (either alternating or direct).

"Faying surfaces", as known in the art, are those surfaces of respective articles in contact with one another to be joined, or that have been joined. A faying surface may be a region of a larger surface of a composite article, such a region of an aerodynamic panel or fuselage. A faying surface may be a distinct surface of a composite article, such as a face extending at an angle or protruding from other parts of a composite article. For example, a stringer or supporting rib or beam may comprise one or more such faying surfaces. Faying surfaces may be generally planar or elongate (of high aspect ratio), but may be of any suitable shape or configuration. The faying surface of an article to be joined may be prepared in such a way as to enhance the strength of the join. For example, a faying surface may be roughened or provided with a non-infused region of reinforcement material, into which a meltable material may infuse during welding. The methods disclosed herein may include such surface preparation.

DESCRIPTION OF THE DRAWINGS

Example embodiments will now be described with reference to the following figures in which.

DETAILED DESCRIPTION OF EXAMPLE EMBODIMENTS

Resistance welding relies on a conductive element made of a conductive material (typically stainless steel mesh), that is placed between the faying surfaces of the components to be welded. This conductive element heats up due to joule losses when current is applied, and typically in combination with adequate pressure and cooling, can generate coherent welds for thermoplastic materials.

The traditional resistance welding process dictates that the conductive element is sized for the part weld area, i.e. contact area between the faying surfaces, and the current is applied across the entire length in one process step, welding the entire part in the process.

Whilst resistance welding is at the highest technology readiness level and is the most well understood process for thermoplastic welding, resistance welding is conventionally assumed to be of limited applicability; including in particular weld length limitations due to the long or large susceptors requiring massive power supplies to generate and sustain correct welding temperatures.

Resistance welding has the advantage that because it does not rely on the reinforcement material or stacking sequence or thickness (which is a limitation of alternative methods such as many induction or ultrasonic welding methods) to generate heat. Accordingly, the welding recipe used is independent of those parameters, only requiring to generate sufficient heat to reach the processing temperature of the adjacent thermoplastic material, which is often the matrix material of the composite articles being welded. Additionally, resistance welding can be used for welding non-electrically conductive materials (e.g. glass fibre).

Embodiments disclosed herein remove the high power requirement and size limitations normally associated with resistance welding.

Figure 1:
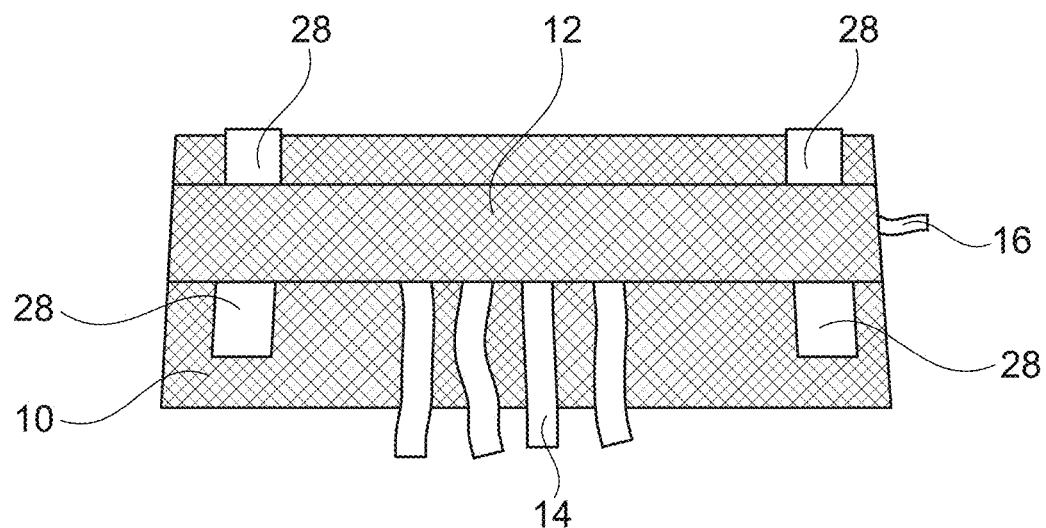
FIG. 1 shows a test example of composite articles prior to welding.

FIG. 1 shows a test example of the inventive method. A first composite article 10, in this example a laminate sheet of thermoplastic carbon fibre composite material, in which woven plies of a carbon fibre fabric reinforcement material are impregnated with a thermoplastic matrix material, is placed on a work bench. A second composite article 12, a strip of the same composite material as the first composite article, is placed lengthwise along the first composite article. It will be understood that a range of other reinforcement materials may alternatively, or additionally, be used, such as plies of non-woven or unidirectional material, non-crimp material, etc.

For the purposes of the test example, a region of the top side of the first composite article 10 extending between electrode portions (discussed below) constitutes a first faying surface, and the region of the underside of the second composite article 12 constitutes a second faying surface. The faying surfaces define a contact area between the first and second composite articles 10, 12.

Figure 2:
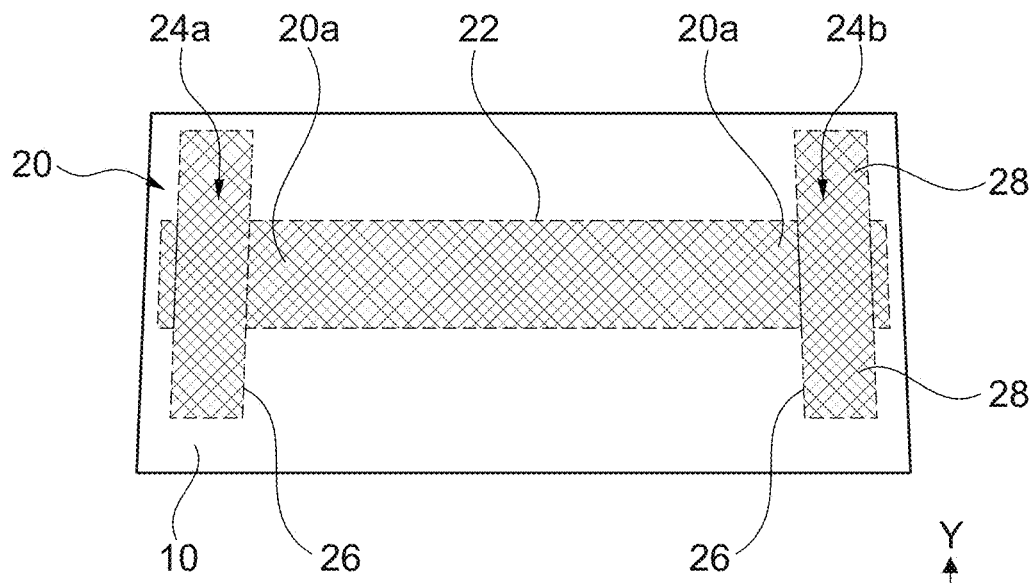
FIG. 2 shows a conductive element on a faying surface of a composite article.

Provided therebetween is a conductive element, indicated generally as 20, formed from a stainless steel woven mesh. As disclosed herein, the conductive element may in alternative embodiments comprise one or more layers of a conductive fabric, paint, ink or the like. As shown in FIG. 2, the conductive element 20 includes a longitudinal portion 22, which is of substantially the same length and width as the contact area, and first and second electrode portions 24a, 24b.

The plurality of electrode portions 24a, 24b have a lower resistivity than the adjacent portions 20a of the conductive element 20.

The longitudinal portion 22 of the conductive element 20 is formed from a length of the stainless steel mesh, extending along a length (in the direction X) of the contact area. The electrode portions 24a, 24b are each formed from a lateral portions 26 of the steel mesh, extending across the width (direction Y) of the contact area, defining electrodes 28 at the exposed ends thereof which extend beyond the contact area. The lateral portions 26 and the longitudinal portion 22 are in electrical contact with one another, thereby resulting in the electrode portions 24a, 24b having lower resistivity. In the example shown, the lateral portions are orthogonal to the longitudinal portion, however an alternative embodiments and as may be required by the geometry of a composite article, the lateral portions may extend at an alternative angle across the width of the contact area.

The strips of steel mesh from which the conductive element is formed are in this test example simply laid on the first composite article, before laying the second composite article thereon. The composite articles are taped together as shown in FIG. 1. The composite articles are then clamped together (not shown).

FIG. 3 schematically shows the steps of the method by which the first and second composite articles 10, 12 can be continuously welded to one another to provide a continuous weld therebetween.

Figure 3A:
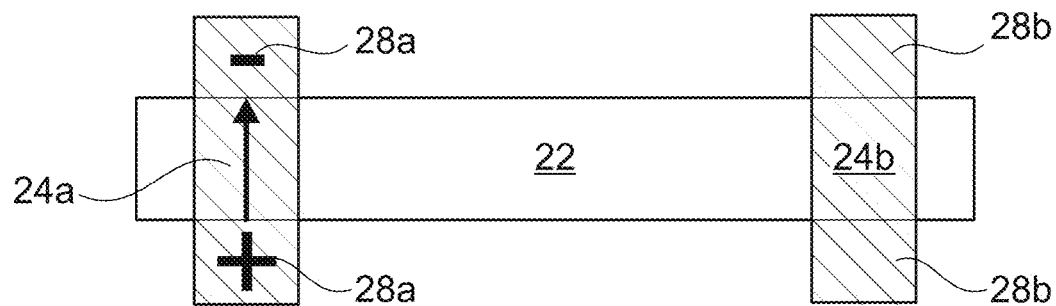
FIGS. 3(a)-(c) illustrate steps of a resistive welding method.

In a first step (FIG. 3(a)), an electrical current is applied between the electrodes 28a of the first electrode portion 24a to raise the temperature of the thermoplastic material and weld together a portion of the faying surfaces between the electrodes 28a of the first electrode portion 24a. The thermoplastic material around the region of faying surfaces that are heated is caused to melt and infiltrate the pores of the steel mesh of the conductive element such that thermoplastic material extends through the thickness of the conductive element between the composite articles, creating a welded join. In some embodiments, an additional layer or layers of thermoplastic material may be provided between the faying surfaces, or the conductive element may be pre-impregnated with thermoplastic material.

Figure 3B:
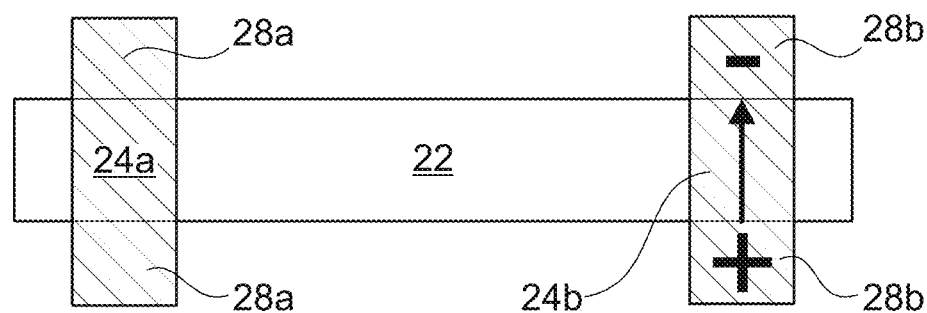

In a second step (FIG. 3(b)), an electrical current is applied between the electrodes 28b of the first electrode portion 24b to raise the temperature of the thermoplastic material and weld together a portion of the faying surfaces between the electrodes 28b of the first electrode portion 24b.

Figure 3C:
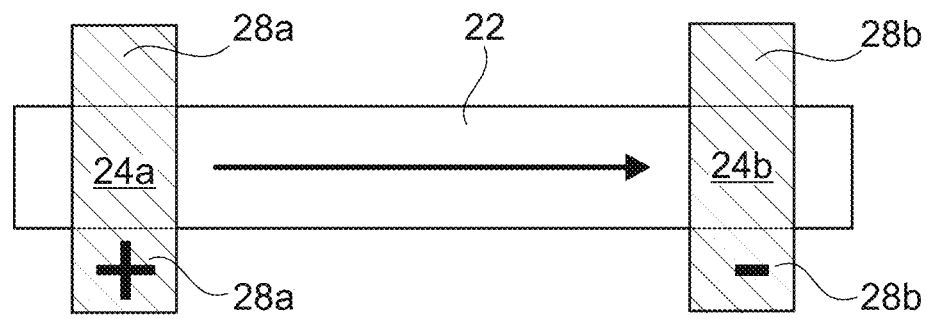

In a third step (FIG. 3(c)), an electrical current is applied between an electrode 28a of the first electrode portion 24a, and an electrode 28b of the second electrode portion 24b, to raise the temperature of the thermoplastic material weld together a portion of the faying surfaces between the electrodes 28a and 28b of the first and second electrode portions. It will be understood that in this step either of the electrodes with the respective electrode portions may be used.

In the first two steps, the lower resistivity of the electrode portions ensures minimal current leakage to adjacent portions of the conductive element, and so results in localised or spot welding across the width of the contact area. Similarly, the lower resistivity ensures that minimal re-melting or re-welding of these regions occurs when welding a portion of the length of the contact area, in the third step.

It will be appreciated that in alternative embodiments these steps can be conducted in any suitable order, for example with the steps of FIGS. 3(a) and (3b) reversed, and/or with the steps of one or other of FIGS. 3(a) and (b) being conducted after that of FIG. 3(c).

Thermocouples 14, 16 were inserted in the test example, along a part of the contact area and at the electrode portions, to monitor temperatures during the welding process. Results of this thermocouple analysis showed minimal temperature rise, and this minimal current leakage into the mesh between the electrode portions during the first and second steps; and minimal heating of the overlapping mesh of the electrode portions during the third step.

The inventive process can be iteratively repeated for larger or high aspect ratio welds, until welding of the entire composite structure has been completed.

Additionally, this process only requires access to one side of the part (e.g. welding stringers/frames from the inside of a fuselage) and/or electrode portions may be positioned where access to the electrodes is most convenient (e.g. between frame bays of an aerospace structure).

FIGS. 4(a) to (f) schematically depict methods comprising a greater number of electrode portions (four, in the examples shown). A conductive element 120 can be positioned between the faying surfaces of composite articles (not shown), generally as discussed above in relation FIG. 1.

The composite element 120 comprises a longitudinal portion 122 and a plurality of 4 electrode portions 124a-d spaced apart along a length of the longitudinal portion. The faying services adjacent to the first and second electrode portions 124a, b can be spot welded by applying a current between the electrodes 128a of the first electrode portion 124a and by applying a current between the electrodes 128b of the second electrode portion 124b (FIG. 4(a)). By applying a current between electrodes 128a and 128b of the first and second electrode portions 128a, 128b, the region 122a of the longitudinal portion 122 therebetween is then resistively welded (FIG. 4(b)) generally as discussed in relation to FIG. 3.

Figure 4A:
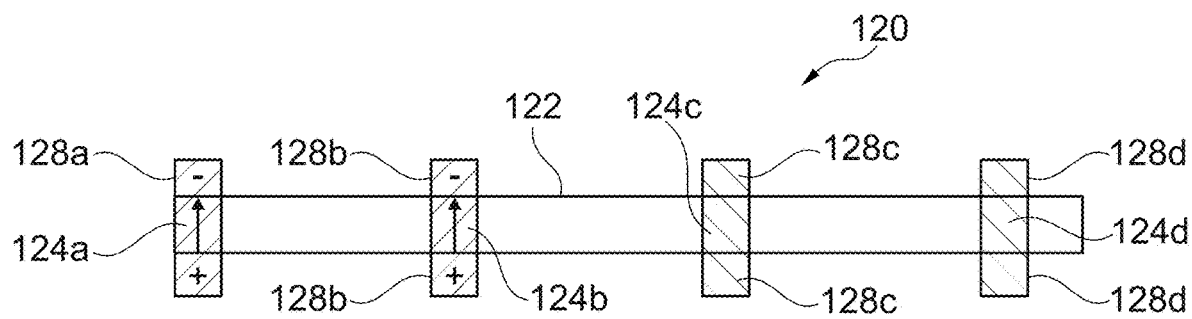
FIGS. 4(a)-(f) and FIGS. 5(a)-(f) show further examples of resistive welding methods.
Figure 4B:
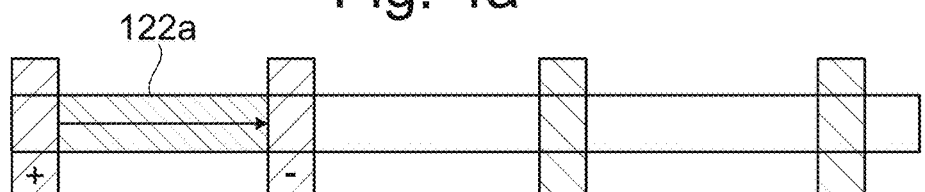
Figure 4C:
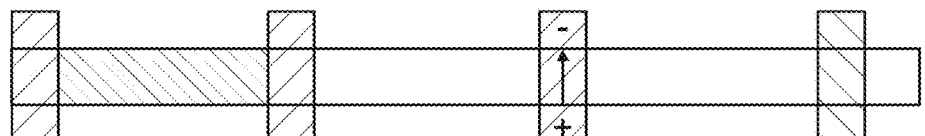
Figure 4D:
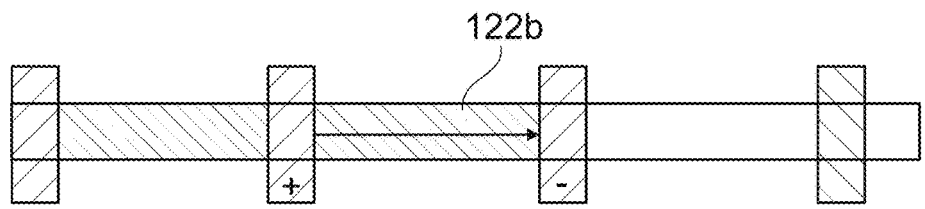
Figure 4E:
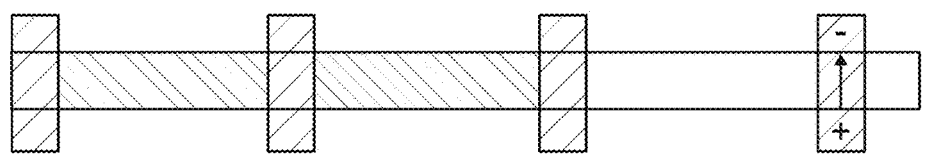
Figure 4F:
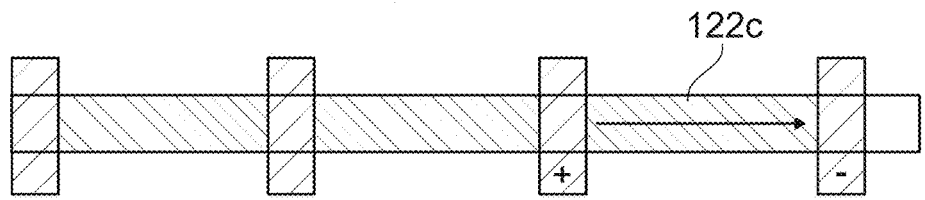

FIG. 4(c) depicts applying a current between the electrodes 128c of the third electrode portion 124c, to spot weld the region of the flying surface adjacent to the third electrode portion. The region 122b between the second and third electrode portions is then welded by applying a current between an electrode of the second electrode portion 124b and an electrode of the third electrode portion 124c (FIG. 4(d)). An electrical current is then applied between the electrodes 128d of the fourth electrode portion 124d, to spot weld the faying surfaces adjacent to the fourth electrode portion (FIG. 4(e)) and then the region 122c of the longitudinal portion 122 resistively welded by applying a current between an electrode of the third electrode portion 124c and an electrode of the fourth electrode portion 124d.

Figure 5A:
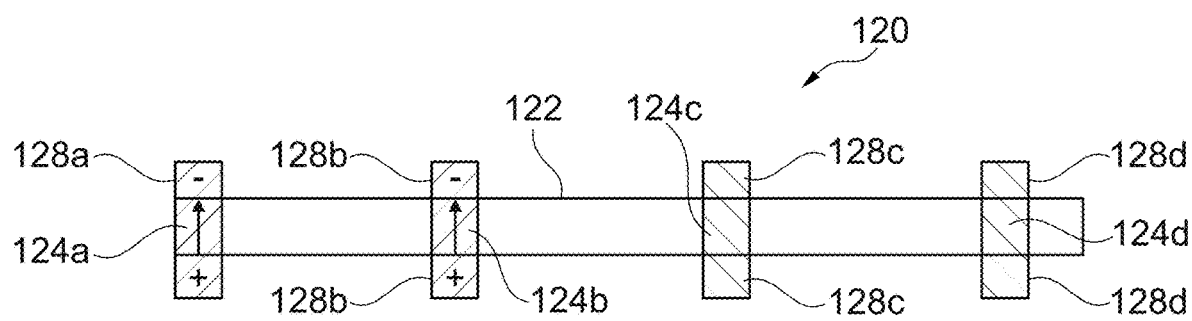
Figure 5B:
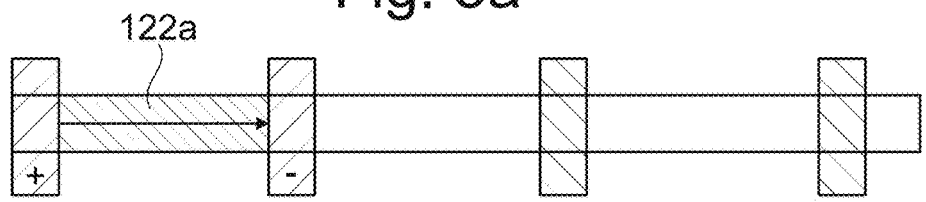
Figure 5C:
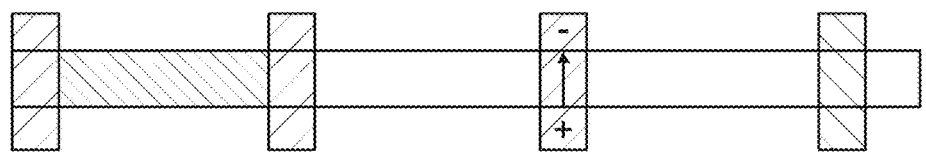
Figure 5D:
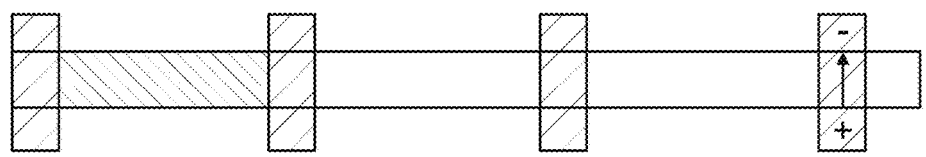

FIGS. 5(a)-(f) show an alternative embodiment of the resistance welding method. Spot welding across the first and second electrode portions and along the regions 122a between the first and second electrode portions is illustrated in FIGS. 5(a) and (b). Spot welding across the third and fourth electrode portions 124c and 124d is the performed (FIGS. 5(c) and (d)). These steps may be conducted in either order, before or after welding along the region 122a.

Figure 5E:
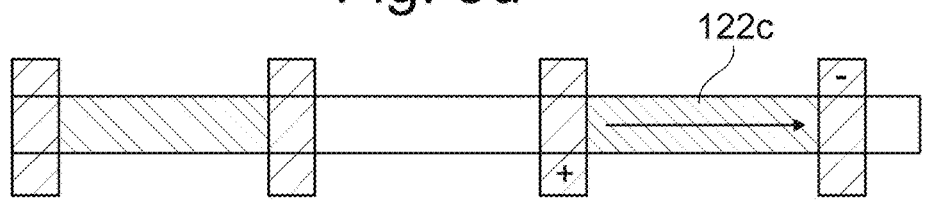
Figure 5F:
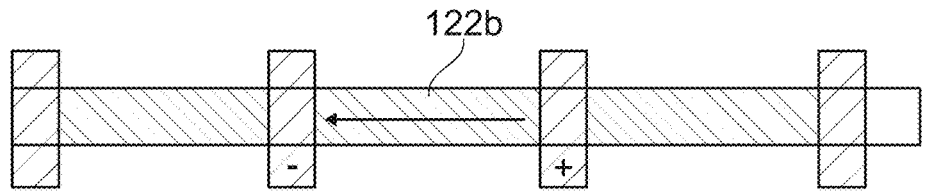

The regions 122b and 122c of the longitudinal portion between the second and third electrode portions 124b and 124c, and the third and fourth electrode portions 124c and 124d, respectively, can then be resistively welded (FIGS. 5(e) and 5(f)). Again these steps may be conducted in either order and indeed, in alternative embodiments, all of the four electrode portions may be spot welded before subsequently welding the regions 122a to 122c of the longitudinal portion 122.

This "tack welding" process can be used to fix the second composite article in place before resistively welding the longitudinal portion. This can be of particular benefits for welding across large or high aspect-ratio contact areas, to prevent movement during step welding along the length of the contact area. The inventive method and apparatus provides for a continuous weld to be broken down into steps, since the difference in the resistivity between the electrode portions and the adjacent regions of the conductive element allows selected regions of the contact areas to be preferentially welded with negligible current leakage and heat generation to the surrounding regions of the conductive element.

Another advantage of the inventive process for some applications is that, by breaking the welding process into stages, providing a consistent resistance weld between composite articles with variable cross section faying surfaces is possible, such as tapered stringers as might be provided in a tapered fuselage section of an aircraft; because the welding recipe can be optimized for each step of the process.

Figure 6:
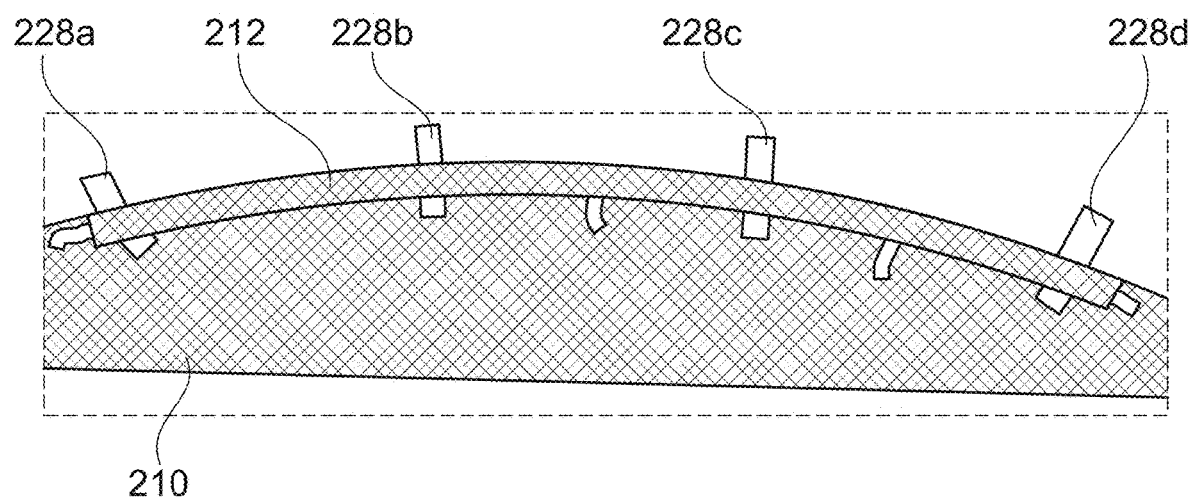
FIG. 6 shows a further test example of composite articles prior to welding.
Figure 7:
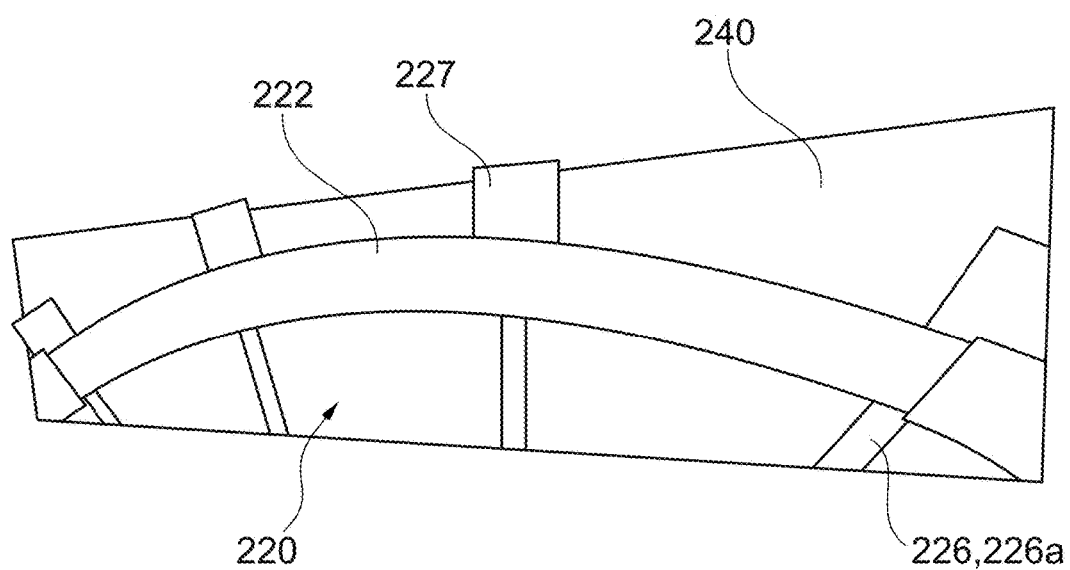
FIG. 7 shows a conductive element during assembly thereof.

FIGS. 6 and 7 show a further example of the application of the invention to a contoured part.

A first composite article 210, a sheet of the thermoplastic carbon fibre composite material, is placed on a work bench. A second composite article 212, a curved strip of the same composite material as the first composite article, is positioned adjacent to a correspondingly curved upper edge of the first composite article 210.

The region of the first composite article 210 adjacent to the second composite article 212 constitutes a first faying surface, and the underside of the second composite article 212 constitutes a second faying surface. The faying surfaces define a contact area between the first and second composite articles 210, 212. Electrodes 228a-228d of electrode portions spaced apart along the curved length of the contact area, extend from between the faying surfaces.

Provided between the composite articles 210, 212 is a stainless steel mesh conductive element. The conductive element is cut to size in situ, using the second composite article, curved strip 212 as a template to form the longitudinal portion 222 thereof, as shown in FIG. 7, and the lateral portions 226 and the longitudinal portion 222 laid out on the first composite article, before laying the second composite article thereon. An electrode is formed by placing a piece of foil 227 in electrical contact with the ends 226a of each lateral portion. In the figure, the electrodes have been formed along one side of the longitudinal portion. The further reduction in resistivity provided by the foil (or, in alternative embodiments, other electrode such as wire or the like) ensures that Ohmic/Joule heating occurs preferentially in the regions of the longitudinal electrode portions between the faying surfaces and not in those portions which extend therefrom.

The pieces of mesh are taped loosely in position on a backer paper 240, to assist in transferring the conductive element 220 to the desired position on the first composite article.

There first and second composite articles are then clamped together and resistively welded in the stepwise manner generally as discussed above in relation to FIGS. 4 and 5.

Figure 8:
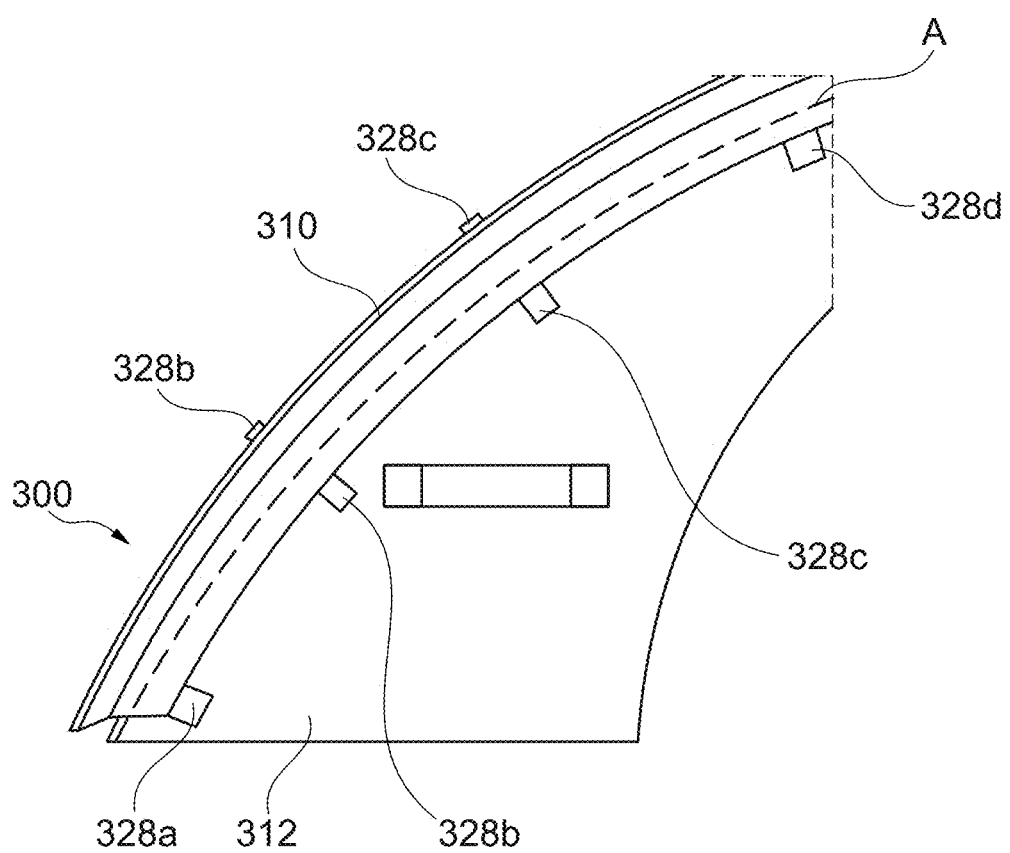
FIG. 8 shows a composite structure including two composite articles resistively welded together.

FIG. 8 shows a composite structure 300, comprising a first composite article 310 (made of a thermoplastic carbon fibre composite material) which has been joined by resistively welding by the stepwise methods disclosed herein, to a second composite article 312. In the embodiment shown, the composite structure is a subsection of a nose wheel well bulkhead. The first composite article 310 is an L-Chord, which functions as a stiffening element for the second composite article, which is the "web". Visible in the figure are electrodes 328a-328d at the ends of corresponding electrode portions of a steel mesh conductive element (not visible in the figure) which are spaced apart along a (curved) length (along the curved dotted line A) of the contact area between the faying surfaces of the web 312 and the L-chord 310.

The conductive element within the composite structure 300 was cut to size in situ, using the faying surface of the L-chord 310 as a template for the longitudinal portion of the conductive element, and assembled on the faying surface along the curved upper edge of the web 312 prior to welding.

The electrodes can optionally be trimmed away, or alternatively left in place to facilitate repair at a later time.

Figure 9:
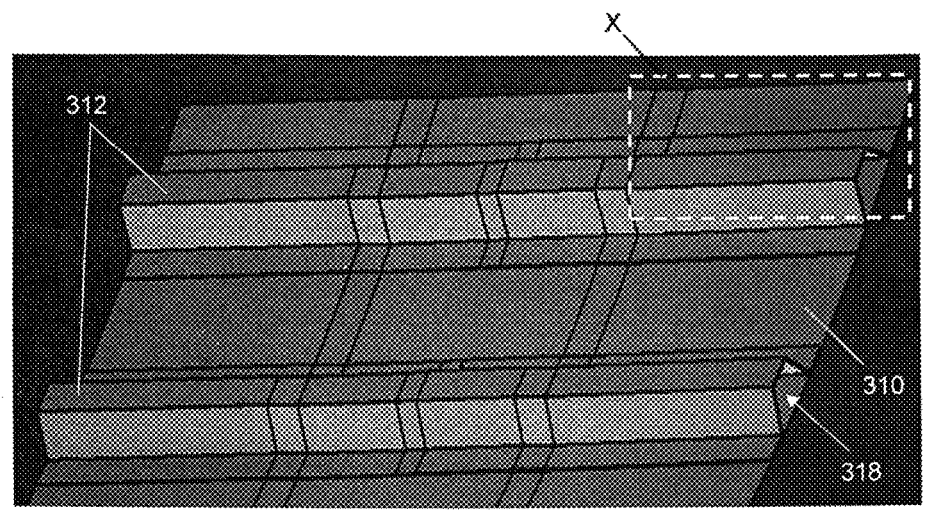
FIG. 9 shows composite articles of a closed-geometry composite structure.
Figure 10:
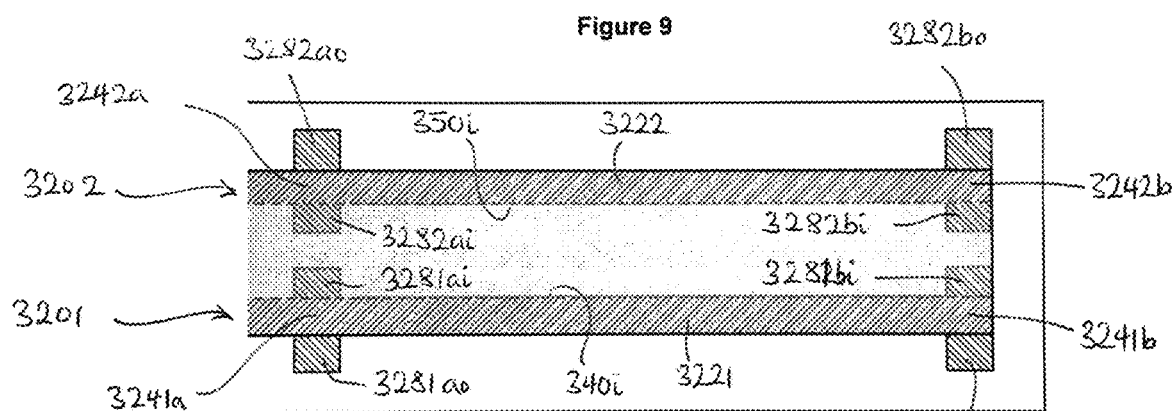
FIG. 10 shows a schematic plan view of region X of FIG. 9.
Figure 11:
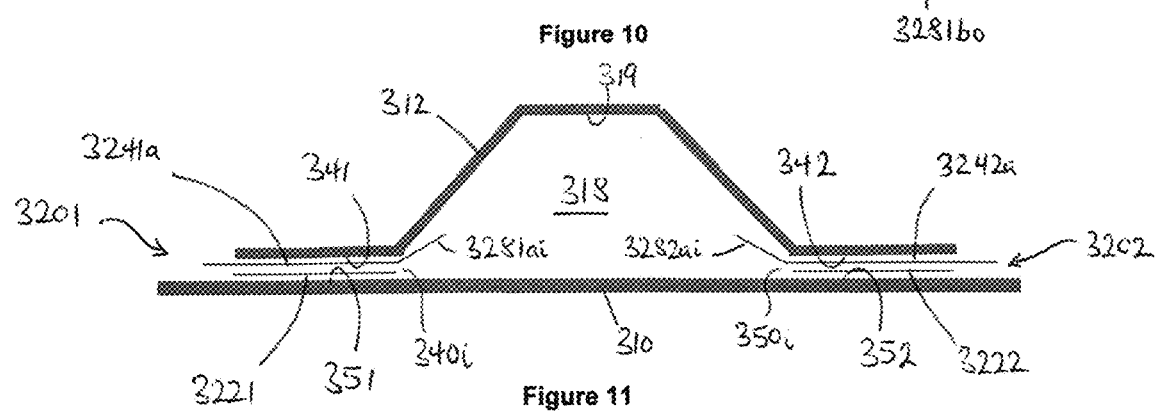
FIG. 11 shows a schematic cross sectional view through the region X of FIG. 9.

As discussed above, two composite articles may define a closed geometry composite structure, having a substantially enclosed volume. FIG. 9 shows an example of an aircraft skin panel 310 (a first composite article) and stringers 312 on the panel. Each of the stringers includes two faying surfaces (such that corresponding faying surfaces are defined as regions of the skin panel 310), and define an elongate, trapezoidal in cross section, tubular substantially enclosed volume 318 between each stringer 312 and the skin 310. FIG. 10 schematically illustrates in plan view selected features of the highlighted region X of FIG. 9. FIG. 11 is a schematic cross sectional view through the region X, through the stringer 312.

The stringer 312 has a primary faying surface 341 and a secondary faying surface 342. The skin 310 has corresponding primary and secondary faying surfaces 351, 352. Between the respective primary and secondary contact areas 340, 350 between these faying surfaces are primary and secondary conductive elements 3201 and 3202, each generally as disclosed above in relation to other embodiments, having longitudinal portions 3221 and 3222 and electrode portions 3241 and 3242 in electrical contact therewith. Only two electrode portions 3241a and 3241b, and 3242a and 3242b of each conductive element are shown, but it will be understood that for high aspect ratio parts such as panels reinforced with stringers, a larger number of electrode portions will typically be used.

Each of the contact surfaces has an inner edge portion 340i, 350i, within the enclosed volume 318. Each of the electrode portions has, extending out from the inner edge portions 340i, 350i, of contact surfaces 340, 350, are inner electrodes 3281ai, 3281bi, 3282ai and 3282bi. Extending out from the outer edge portions 340o, 350o of the contact surfaces 340, 350 opposite to the inner edge portions, are outer electrodes 3281ao, 3281bo, 3282ao and 3282bo; at the oppose ends of the respective electrode portions 3241a, 3241b, 3242a, 3242b.

Access to the inner electrodes 3281ai, 3281bi, 3282ai and 3282bi is hindered by the composite materials and access becomes progressively impractical the further from the open ends of the stringers that an electrode is positioned.

Were resistive welding to be attempted using electrode portions extending across both contact areas, the regions within the enclosed volume 318 would not be adjacent any meltable or softenable matrix material (in this instance thermoplastic). Consequently, applying current would overheat these regions, causing damage and reliable bonds between the faying surfaces could not be ensured. The use of separate conductive elements makes resistive welding possible, using electrical connection apparatus capable of remotely establishing electrical connection with inner electrodes.

The inner electrodes 3281ai, 3281bi, 3282ai and 3282bi are oriented diagonally away from the skin 310 during assembly, ready for remote electrical connection.

Figure 12:
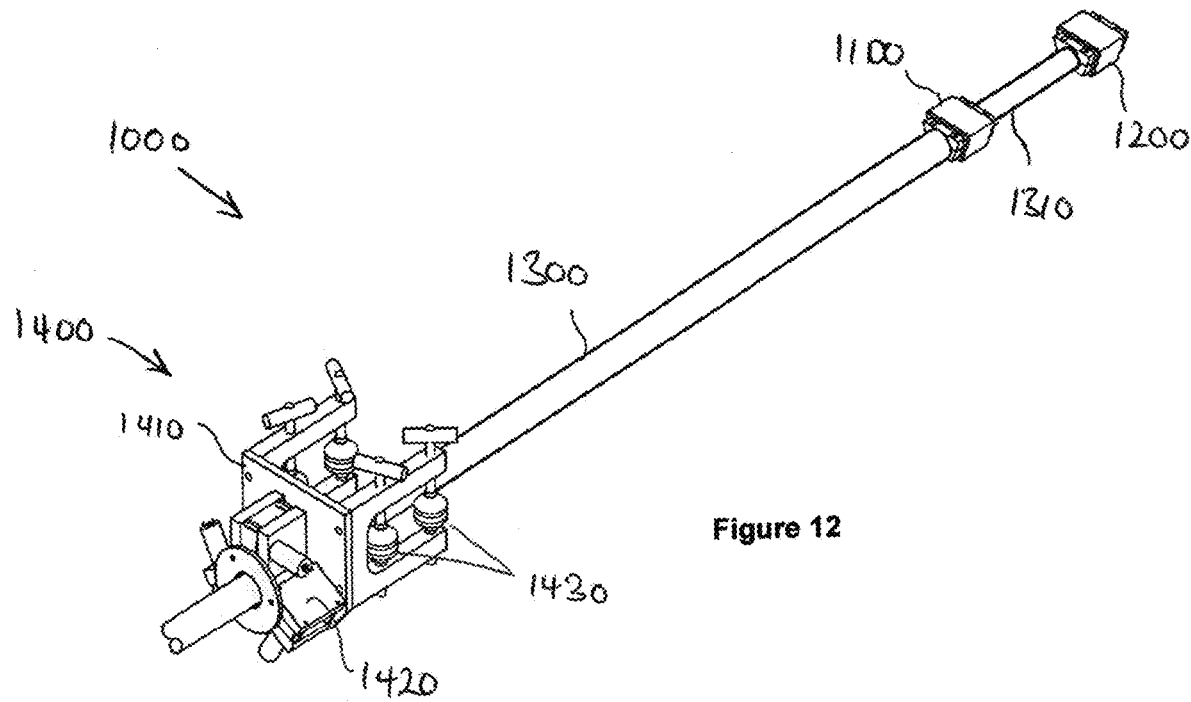
FIG. 12 shows an example of electrical connection apparatus.

FIG. 12 shows an electrical connection apparatus 1000, adapted to remotely connect to the inner electrodes and, whilst connected, perform thermal welding operations as disclosed herein.

The apparatus 1000 includes a first probe arrangement 1100 and a second probe arrangement 1200, attached to the distal end of an elongate umbilical 1300. The umbilical is a tubular member through which electrical cables and pneumatic supply lines extend, as discussed in further detail below. The probe arrangements 1100, 1200 are connected via a further tubular member 1310. The probe arrangements are positioned a distance apart equal to the distance between the pairs of electrode portions 3241a and b, and 3242a and b. The conductive elements 3201, 3202 can be assembled so that the electrode portions are suitably spaced.

The apparatus 1000 also includes a drive arrangement 1400, through which the umbilical 1300 extends. The drive arrangement includes a frame 1410, to which is mounted an electronic motor 1420. The umbilical 130 extends through the motor 1420 and its longitudinal position controlled using drive wheels (not visible in the figure). The drive arrangement 1400 also includes guide wheels 1430. The umbilical is longitudinally incompressible, under the forces encountered in normal use, but is provided with a degree of flexibility to allow excess length of umbilical to be coiled until required for use.

Figure 13:
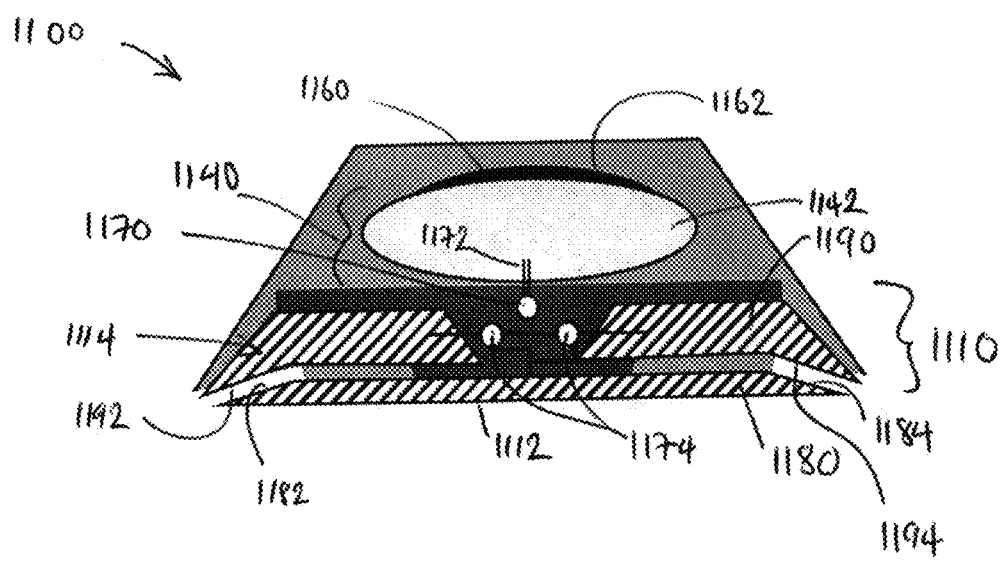
FIG. 13 shows a schematic cross sectional view of a probe portion of the apparatus of FIG. 12.

FIG. 13 shows a schematic cross sectional view of a probe arrangement 1100. The probe arrangement has a foot portion 1110 having a lower surface 1112 that engages the skin panel 310. The probe arrangement 1100 has a body portion, indicated generally as 1140, having a cross sectional shape sized to fit within the enclosed volume 318. The body portion 1140 has an inflatable member 1142, and a shoulder portion 1160, formed as a reinforced region of the outer skin of the inflatable member, the outer surface of which acts as an engagement surface 1162, in use. The probe portion 1100 is shown in FIG. 13 in a contracted configuration in which the distance between the engagement surfaces 1112, 1162 is less than the distance between the skin 310 and the opposed inner face 319 of the substantially enclosed volume 318.

A pneumatic supply conduit 1170 (which runs through the umbilical and is connectable to a compressed air supply) extends to the foot portion 1110, and supply tube 1172 branches therefrom to the interior of the inflatable member 1142. The conduit 1172 also runs on through the tubular member 1310 to the second probe arrangement 1200. Also extending to the probe portion 1100 via the umbilical 1300 are electrical supply cables 1174, which supply electrical current to (and enable detection of the connection status of) the electrical contact element 1114. The electrical contact element 1114 has a lower part 1180, and an upper part 1190 that is operatively coupled via platform 1118 of the foot portion 1110, to the inflatable member 1142. The lower part 1180 has a primary lower contact surface 1182 to one side of the probe portion and a secondary lower contact surface 1184 to the opposite side of the probe portion. The upper part 1190 has a primary upper contact surface 1192 to one side of the probe portion and a secondary upper contact surface 1194 to the opposite side of the probe portion. The opposed lower and upper contact surfaces provide a gap therebetween for the inner electrodes.

Figure 15A:
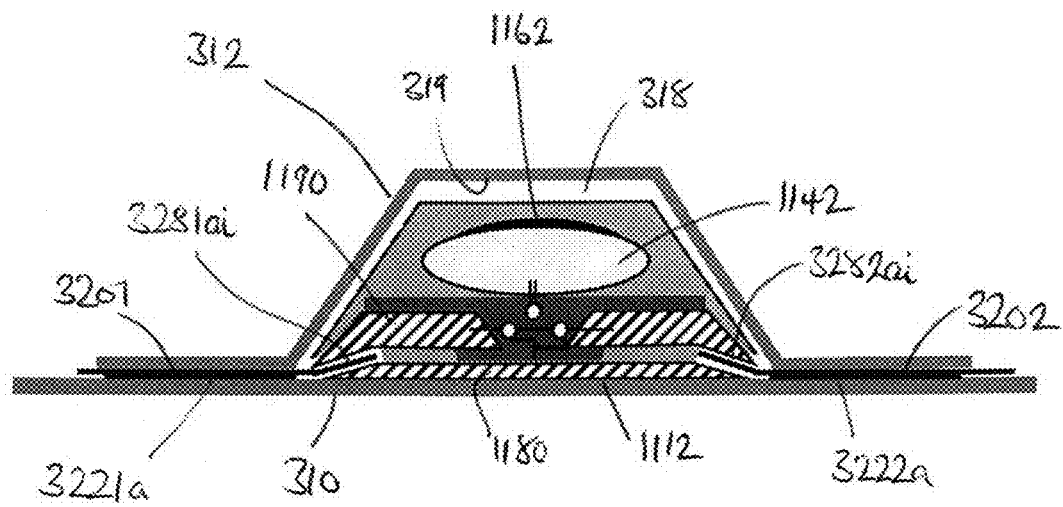
FIG. 15a shows a schematic cross sectional view of a probe portion of the apparatus of FIG. 12 within the substantially enclosed volume, in a contracted configuration.
Figure 15B:
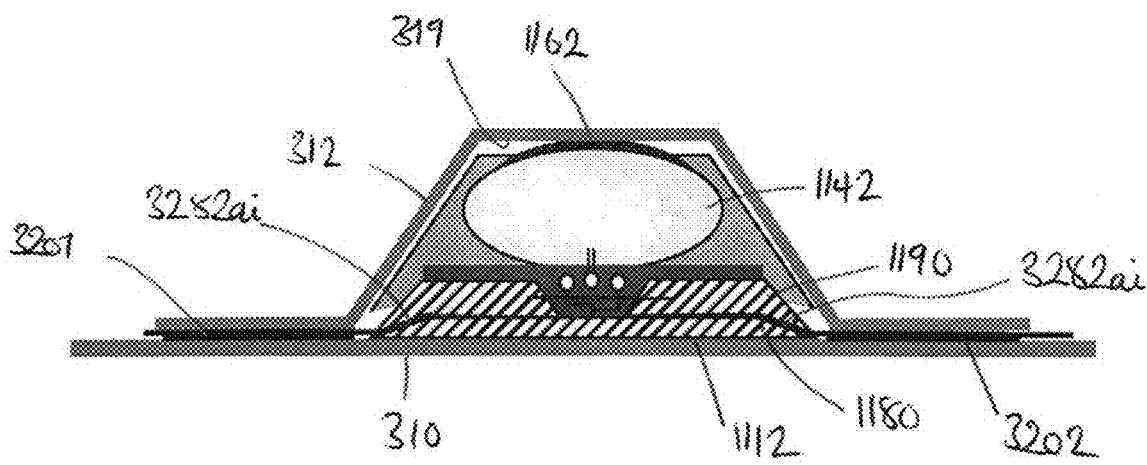
FIG. 15(b) shows a schematic cross sectional view of a prove portion of the apparatus of FIG. 12 within the substantially enclosed volume, in an extended configuration.

The probe portions of the electrical contact apparatus 1000 can be introduced into the volume 318, while in the contracted configuration, and positioned using the drive arrangement 1400, to place the probe portions adjacent to the inner electrodes 3281ai, 3281bi, 3282ai and 3282bi, as shown schematically in FIG. 15(a) for the electrodes of the electrode portions 3221a and 3222a. The inflatable member 1142 is then inflated so that the engagement surface 1162 engages the upper wall 319 of the enclosed volume 318, as shown in FIG. 15(b). The inner electrodes 3281ai and 3282ai are trapped between the upper and lower parts 1180, 1190 and so form a strong electrical connection therewith.

Figure 14:
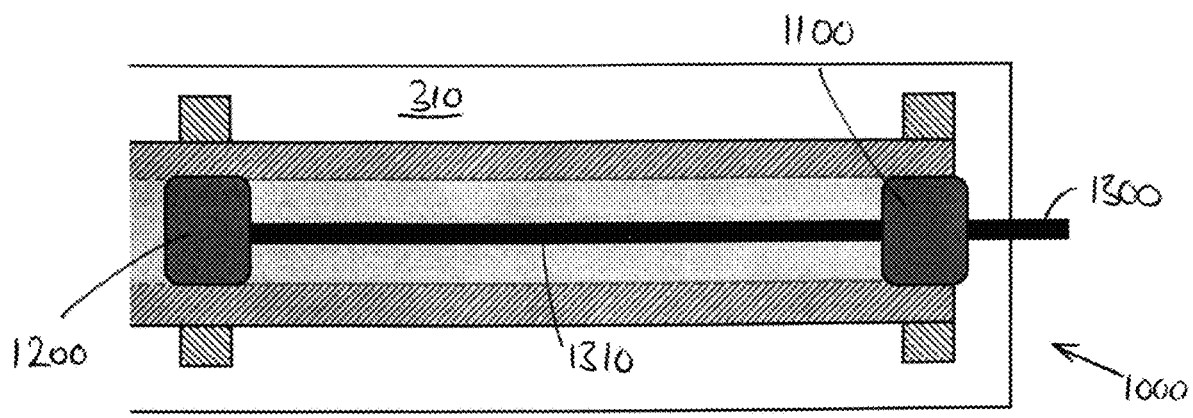
FIG. 14 shows a schematic plan view of the electrical connection apparatus within the substantially enclosed volume of the structure shown in FIG. 9.

In this position, as illustrated in FIG. 14, the apparatus 1000 can be used to deliver current via the inner electrodes 3281ai, 3281bi, 3282ai and 3282bi, in the manner generally disclosed above in relation to FIGS. 1 to 8. In conjunction with an apparatus to connect to the outer electrodes, 3281ao, 3281bo, 3282ao and 3282bo, the four spot welds across the electrode portions can be conducted across the electrode portions 3221a and 3221b, and 3222a and 3222b, with the apparatus in the position shown in FIG. 14. In addition, the longitudinal welds between the electrode portions 3221a and 3222a, and between electrode portions 3221b and 3222b can all be completed with the apparatus 1000 in this single position, if required. Alternatively, the inflatable member 1142 may be deflated to disconnect the inner electrodes, before longitudinal welds between the electrode portions 3221a and 3222a are formed using the outer electrodes 3281ao, 3281bo and 3282ao and 3282bo. Still further, the electrical connection apparatus 1000 may be advanced so as to form more than two spot welds, before longitudinal welding is conducted (using the inner or the outer electrodes).

Figure 16:
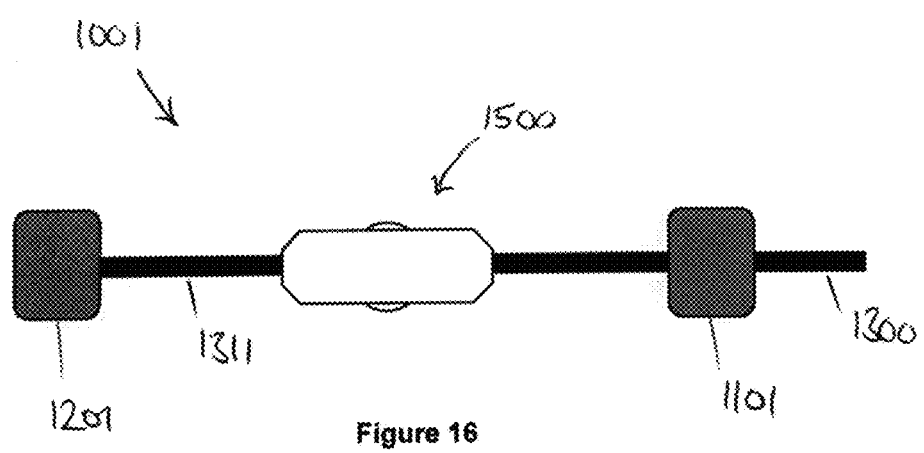
FIG. 16 shows another electrical connection apparatus.

An alternative electrical connection apparatus 1001 is shown in FIG. 16, having at the end of umbilical 1300 first and second probe portions 1101 and 1201 as previously described. Mounted to the tubular 1311 by which the probe portions are connected, is a thermal imaging camera 1500. The camera 1500 can be used to acquire thermal images from within the enclosed volume 318, when the apparatus 1001 is in situ. This non-destructive testing can be conducted during or immediately after welding steps have been conducted, to verify weld quality (e.g. during cooling), or during a separate step by applying a lower current between electrodes sufficient to heat portions of each of the conductive elements 2301, 3202 to below the melting temperature of the thermoplastic material within the contact areas 340, 350. The apparatus 1000, 1001 and/or the conductive elements disclosed herein can also be used throughout the lifetime of the composite structure formed between the article 310, 312 to perform non-destructive testing (conductivity measurements, resistivity measurements or thermal imaging (in the case of apparatus 1000, from outside of the cavity) and to re-weld or repair any portion of the contact surfaces as required.

Whilst the examples above relate to thermoplastic carbon fibre composites, the methods and operators may also be applied to other composites, such as fibreglass or composites with a curable matrix material such as epoxy based carbon fibre composites. The faying surfaces may be joined, in such embodiments, by roughening or providing porosity thereto, such that a meltable or softenable material, such as a thermoplastic, provided between the faying surfaces during welding, can infiltrate the porous faying services or conform to the roughened faying services, and join such composite articles together. The meltable of softenable material can also comprise an uncured or partially cured resin or polymer, wherein resistively welding initiates or progresses the curing reaction . . . .

The invention claimed is:

1. A method of resistance welding a first faying surface of a first composite article to a second faying surface of a second composite article, wherein one or both of the faying surfaces comprises a meltable or softenable material; the method comprising:
contacting the first and second faying surfaces to define a contact area therebetween;
providing a conductive element between the faying surfaces along a length of the contact area; the conductive element comprising a plurality of lower resistivity electrode portions spaced apart along the length of the contact area; wherein each electrode portion extends across a respective width of the contact area and each end thereof comprising an electrode extending from the contact area;

applying an electrical current between the electrodes of a first said electrode portion to raise the temperature of the meltable or softenable material and weld together a portion of the faying surfaces between the electrodes of the first electrode portion;

applying an electrical current between the electrodes of a second said electrode portion to raise the temperature of the meltable or softenable material and weld together a portion of the faying surfaces between the electrodes of the second electrode portion; and applying an electrical current between electrodes of the first and second electrode portions to raise the temperature of the meltable or softenable material and weld together a portion of the faying surfaces of the first and second electrode portions.

2. The method of claim 1, wherein the meltable or softenable material is a thermoplastic polymer.

3. The method of claim 1, comprising resistively welding sequentially along a length of the contact area.

4. The method of claim 1, comprising applying a force between the first and second composite articles, to urge the faying surfaces together.

5. The method of claim 1, wherein the longitudinal portion comprises a conductive sheet, foil or fabric; and wherein each of the electrode portions of the conductive element further comprises a lateral portion comprising one or more layers of a conductive sheet, foil or fabric placed across a respective width of the longitudinal portion, and in electrical contact therewith.

6. The method of claim 1, comprising assembling the conductive element, by providing a conductive longitudinal portion having a length corresponding to a length of the required contact area, providing a plurality of conductive lateral portions each sized to extend across a width of the required contact area; and bringing the plurality of lateral portions into electrical contact with the longitudinal portion, at each of a plurality of required locations spaced apart along the length of the longitudinal portion, to thereby form electrode portions having lower resistivity than adjacent portions of the conductive element.

7. The method of claim 6, comprising cutting the longitudinal and/or lateral portions may from a conductive sheet material or a conductive fabric material.

8. The method of claim 1, comprising placing the conductive element on the first faying surface, or assembling the conductive element in situ on the first faying surface.

9. The method of claim 1 wherein the first and second composite articles each comprise a matrix material, wherein the matrix material is the meltable or softenable material.

10. The method of claim 1, wherein first and second composite articles each comprise more than one faying surface, wherein the method comprises:

contacting more than one first faying surface with more than one corresponding second faying surface, to define more than one contact area; providing a conducting element between the faying surfaces of each of the more than one contact areas; and applying a current between the electrodes of a first electrode portion, a second electrode portion and between electrodes of a first and a second electrode portion, of each of the more than one conductive elements;

wherein the composite structure to be formed by resistance welding the faying surfaces of the first and second composite article is a closed-geometry composite structure and a substantially enclosed volume is defined between the first and second composite articles; the method further comprising remotely establishing electrical contact with one or more, or each of the electrodes extending from inner edge portions of contact areas within the substantially enclosed volume.

\* \* \* \* \*